(12) United States Patent
Corbal et al.

(10) Patent No.: US 10,157,061 B2
(45) Date of Patent: Dec. 18, 2018

(54) INSTRUCTIONS FOR STORING IN GENERAL PURPOSE REGISTERS ONE OF TWO SCALAR CONSTANTS BASED ON THE CONTENTS OF VECTOR WRITE MASKS

(75) Inventors: Jesus Corbal, Barcelona (ES); Matthew J. Craighead, Austin, TX (US); Bret L. Toll, Hillsboro, OR (US); Andrew T. Forsyth, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 13/994,060

(22) PCT Filed: Dec. 22, 2011

(86) PCT No.: PCT/US2011/066998
§ 371 (c)(1),
(2), (4) Date: Jun. 20, 2014

(87) PCT Pub. No.: WO2013/095553
PCT Pub. Date: Jun. 27, 2013

(65) Prior Publication Data
US 2014/0297991 A1    Oct. 2, 2014

(51) Int. Cl.
*G06F 9/30* (2018.01)
(52) U.S. Cl.
CPC ...... *G06F 9/30036* (2013.01); *G06F 9/30018* (2013.01); *G06F 9/30029* (2013.01); *G06F 9/30054* (2013.01)
(58) Field of Classification Search
CPC .................................................. G06F 9/30029
See application file for complete search history.

(56) References Cited

U.S. PATENT DOCUMENTS

| 4,490,786 | A | | 12/1984 | Nakatani |
| 4,873,630 | A | * | 10/1989 | Rusterholz ............. G06F 9/325 712/3 |

(Continued)

FOREIGN PATENT DOCUMENTS

| CN | 1688966 A | 10/2005 |
| CN | 1890630 A | 1/2007 |

(Continued)

OTHER PUBLICATIONS

Notice of Reasons for Rejection, Japan Application No. 2014-502538, dated Dec. 2, 2014, 8 pages.

(Continued)

*Primary Examiner* — John M Lindlof
(74) *Attorney, Agent, or Firm* — Nicholson De Vos Webster & Elliott, LLP

(57) ABSTRACT

According to one embodiment, an occurrence of an instruction is fetched. The instruction's format specifies its only source operand from a single vector write mask register, and specifies as its destination a single general purpose register. In addition, the instruction's format includes a first field whose contents selects the single vector write mask register, and includes a second field whose contents selects the single general purpose register. The source operand is a write mask including a plurality of one bit vector write mask elements that correspond to different multi-bit data element positions within architectural vector registers. The method also includes, responsive to executing the single occurrence of the single instruction, storing data in the single general purpose register such that its contents represent either a first or second scalar constant based on whether the plurality of one bit vector write mask elements in the source operand are all zero.

18 Claims, 22 Drawing Sheets

(56) References Cited

U.S. PATENT DOCUMENTS

| | | | |
|---|---|---|---|
| 4,933,839 | A | 6/1990 | Kinoshita et al. |
| 4,945,479 | A | 7/1990 | Rusterholz et al. |
| 5,207,132 | A | 5/1993 | Goss et al. |
| 5,418,973 | A | 5/1995 | Ellis et al. |
| 5,446,912 | A | 8/1995 | Colwell et al. |
| 5,561,808 | A | 10/1996 | Kuma et al. |
| 5,903,769 | A | 5/1999 | Arya |
| 6,185,670 | B1 | 2/2001 | Huff et al. |
| 6,189,094 | B1 | 2/2001 | Hinds et al. |
| 6,625,724 | B1 | 9/2003 | Kahn et al. |
| 7,590,009 | B2 | 9/2009 | Yoon |
| 7,627,735 | B2 | 12/2009 | Espasa et al. |
| 7,917,734 | B2 | 3/2011 | Coke et al. |
| 7,966,476 | B2 | 6/2011 | Coke et al. |
| 7,984,273 | B2 | 7/2011 | Sprangle et al. |
| 2004/0030862 | A1 | 2/2004 | Paver et al. |
| 2006/0176807 | A1* | 8/2006 | Wu .............. H04L 12/5693 370/229 |
| 2007/0074007 | A1* | 3/2007 | Topham ........... G06F 9/30003 712/221 |
| 2007/0079179 | A1 | 4/2007 | Jourdan et al. |
| 2007/0157030 | A1 | 7/2007 | Feghali et al. |
| 2008/0082799 | A1 | 4/2008 | Bloomfield et al. |
| 2008/0100628 | A1 | 5/2008 | Mejdrich et al. |
| 2009/0055712 | A1* | 2/2009 | Hsu .............. H03M 13/158 714/759 |
| 2009/0119489 | A1 | 5/2009 | Pechanek et al. |
| 2009/0171994 | A1 | 7/2009 | Sprangle et al. |
| 2009/0172291 | A1 | 7/2009 | Sprangle et al. |
| 2009/0172348 | A1 | 7/2009 | Cavin |
| 2009/0172349 | A1 | 7/2009 | Sprangle et al. |
| 2009/0172356 | A1 | 7/2009 | Valentine et al. |
| 2009/0172364 | A1 | 7/2009 | Sprangle et al. |
| 2009/0172365 | A1 | 7/2009 | Orenstien et al. |
| 2009/0187739 | A1 | 7/2009 | Nemirovsky et al. |
| 2010/0191939 | A1 | 7/2010 | Muff et al. |
| 2010/0217854 | A1 | 8/2010 | Durairaj et al. |
| 2010/0217954 | A1 | 8/2010 | Liao et al. |
| 2010/0241834 | A1 | 9/2010 | Moudgill |
| 2011/0099333 | A1 | 4/2011 | Sprangle et al. |
| 2011/0153983 | A1 | 6/2011 | Hughes et al. |
| 2011/0173418 | A1 | 7/2011 | Coke et al. |
| 2012/0078992 | A1 | 3/2012 | Wiedemeier et al. |
| 2012/0079233 | A1 | 3/2012 | Wiedemeier et al. |
| 2012/0079253 | A1 | 3/2012 | Wiedemeier et al. |
| 2012/0144167 | A1 | 6/2012 | Yates, Jr. et al. |
| 2012/0166761 | A1 | 6/2012 | Hughes et al. |
| 2012/0185670 | A1 | 7/2012 | Toll et al. |
| 2012/0254588 | A1 | 10/2012 | Adrian et al. |
| 2012/0254589 | A1 | 10/2012 | Corbal San Adrian et al. |
| 2012/0254591 | A1 | 10/2012 | Hughes et al. |
| 2012/0254592 | A1 | 10/2012 | San Adrian et al. |
| 2012/0254593 | A1 | 10/2012 | San Adrian et al. |
| 2013/0305020 | A1 | 11/2013 | Valentine et al. |
| 2014/0149724 | A1 | 5/2014 | Valentine et al. |

FOREIGN PATENT DOCUMENTS

| | | |
|---|---|---|
| CN | 101145384 A | 3/2008 |
| CN | 101488084 A | 7/2009 |
| EP | 2275930 A1 | 1/2011 |
| JP | S61210430 A | 9/1986 |
| JP | H04156613 A | 5/1992 |
| JP | H04163628 A | 6/1992 |
| JP | 11154144 | 6/1999 |
| JP | 2002536712 A | 10/2002 |
| JP | 2005535966 A | 11/2005 |
| JP | 2010066893 A | 3/2010 |
| JP | 2014510350 A | 4/2014 |
| JP | 2014510351 A | 4/2014 |
| JP | 2014510352 A | 4/2014 |
| JP | 2014513340 A | 5/2014 |
| JP | 2014513341 A | 5/2014 |
| JP | 2016029598 A | 3/2016 |
| JP | 2016040737 A | 3/2016 |
| JP | 2017010573 A | 1/2017 |
| KR | 1020080087171 A | 9/2008 |
| TW | 200935304 A | 8/2009 |
| TW | 201042542 A1 | 12/2010 |
| TW | 201140448 A | 11/2011 |
| WO | 2012134532 A1 | 10/2012 |
| WO | 2013095553 A1 | 6/2013 |
| WO | 2013095657 A1 | 6/2013 |

OTHER PUBLICATIONS

1st Office Action, CN Application No. 201180070598.6, dated Mar. 23, 2015, 17 pages.
Notice of Preliminary Rejection, KR Application No. 10-2013-7029045, dated Mar. 26, 2015, 16 pages.
Notice of Allowance, TW Application No. 100145056, dated Apr. 30, 2015, 3 pages.
Allowance Decision of Examination, Taiwan Application No. 100145056, dated Sep. 12, 2014, 2 pages.
"Intel Architecture Software Developers Manual," 1999, 369 pages, vol. 1: Basic Architecture, Intel Corporation.
"Intel Architecture Software Developers Manual," 1999, entire document, specifically pp. 31-40, vol. 2: Instruction Set Reference, Intel Corporation.
"Intel® 64 and IA-32 Architectures Software Developer's Manual," Jun. 2010, entire document, specifically pp. 33-49, vol. 2A: Instruction Set Reference, A-M, Intel Corporation.
"Intel® 64 and IA-32 Architectures Software Developer's Manual," Jun. 2010, entire document, specifically pp. 693-808, vol. 2B: Instruction Set Reference, N-Z, Intel Corporation.
"Intel® 64 and IA-32 Architectures Software Developer's Manual," Oct. 2011, 4181 pages, Combined vols. 1, 2A, 2B, 2C, 3A, 3B and 3C, Intel Corporation.
"Intel® Advanced Vector Extensions Programming Reference," Aug. 2010, entire document, specifically pp. 105-116, Intel Corporation.
"Intel® Advanced Vector Extensions Programming Reference," Jun. 2010, 798 pages, Intel Corporation.
"Intel® Advanced Vector Extensions Programming Reference," Jun. 2011, 595 pages, Intel Corporation.
"Intel® IA-64 Architecture Software Developer's Manual," Jan. 2000, 76 pages, vol. 4: Itanium Processor Programmer's Guide, Intel Corporation.
"Intel® Itanium® Architecture Software Developer's Manual," May 2010, 1898 pages, vol. 1: Application Architecture, Revision 2.3, Intel Corporation.
"Intel® SSE4 Programming Reference," Jul. 2007, entire document, specifically pp. 43-51, Intel Corporation.
Michael Abrash, "Rasterization on Larrabee: A First Look at the Larrabee New Instructions (LRBni) in Action," Mar. 2009, 116 pages.
Pallavi Mehrotra et al., "How to Optimize Your Software for the Upcoming Intel® Advanced Vector Extensions (Intel® AVX)," 2009, 115 pages, IDF2009 Intel Developer Forum, Intel Corporation.
Tom Forsyth, "Larrabee: Software is the New Hardware," 2008, 41 pages, SIGGRAPH2008, Beyond Programmable Shading: Fundamentals, Intel Corporation.
Tom Forsyth, "SIMD Programming with Larrabee," 58 pages, VCG Visual Computing Group, Intel Corporation, downloaded from http://software.intel.com/sites/default/files/m/d/4/1/d/8/GDC09_Forsyth_Larrabee_final.pdf on Aug. 25, 2010.
"C++ Larrabee Prototype Library," 18 pages, downloaded from http://software.intel.com/en-us/articles/prototype-primitives-guide/ on Sep. 1, 2010, Intel Corporation.
"Data Conversion Rules (Windows)," 2010, 4 pages, downloaded from http://msdn.microsoft.com/en-us/library/dd607323(VS.85,printer).aspx on Sep. 28, 2010, Microsoft Corporation.
"Intel® AVX: New Frontiers in Performance Improvements and Energy Efficiency," May 2008, 9 pages, Intel Corporation.

(56) References Cited

OTHER PUBLICATIONS

"Short Vector Extensions in Commercial Microprocessors," Nov. 21, 1998, 5 pages, downloaded from http://www.eecg.toronto.edu/~corinna/vector/svx/ on Aug. 23, 2011.
"Snuffle 2005: the Salsa20 encryption function," 12 pages, downloaded from http://cr.yp.to/snuffle.html#speed on Aug. 23, 2011.
David A. Patterson et al., Computer Organization and Design: the Hardware/Software Interface, 2nd Edition, 1998, book cover page, title page, publication page, p. 751, Morgan Kaufmann Publishers, Inc., San Francisco, California.
Jon Stokes, "SIMD architectures," 2 pages, downloaded from http://arstechnica.com/old/content/2000/03/simd.ars on Aug. 23, 2011.
Larry Seiler et al., "Larrabee: A Many-Core x86 Architecture for Visual Computing," Aug. 2008, 15 pages, ACM Transactions on Graphics, vol. 27, No. 3, Article 18.
Lecture MIMD1, Fall 2001, 4 pages.
Michael Abrash, "A First Look at the Larrabee New Instructions (LRBni)," Apr. 1, 2009, 14 pages, Dr. Dobb's the World of Software Development, United Business Media LLC, downloaded from http://drdobbs.com/article/print?articleId=216402188&siteSectionName= on Nov. 8, 2011.
Rao Fu et al., "A Study of the Performance Potential for Dynamic Instruction Hints Selection," 2006, pp. 67-80, Springer-Verlag Berlin Heidelberg.
Rob Wyatt, "Wyatt's World: Cracking Open the Pentium III," 2010, 17 pages, UBM Techweb, downloaded from http://www.gamasutra.com/view/feature/3345/wyatts_world_cracking_open_the_.php?print=1 on Aug. 23, 2011.
ZiiLABS ZMS-05 ARM 9 Media Processor, 5 pages, 2011 ZiiLABS Pte Ltd., downloaded from https://secure.ziilabs.com/products/processors/zms05.aspx on Aug. 23, 2011.
International Search Report and Written Opinion, Application No. PCT/US2011/054303, dated May 25, 2012, 10 pages.
Written Opinion of the International Preliminary Examining Authority, Application No. PCT/US2011/054303, dated Apr. 22, 2013, 3 pages.
International Preliminary Report on Patentability, Application No. PCT/US2011/054303, dated May 16, 2013, 117 pages.
"AMD64 Technology, AMD64 Architecture Programmer's Manual vol. 3: General-Purpose and System Instructions," Feb. 2005, 5 pages, Publication No. 24594, Rev 3.10, Advanced Micro Devices.
1st Office Action, Taiwan Application No. 100145056, dated May 27, 2014, 8 pages.
International Search Report and Written Opinion, Application No. PCT/US2011/066998, dated Aug. 17, 2012, 9 pages.
International Preliminary Report on Patentability, Application No. PCT/US2011/066998, dated Jul. 3, 2014, 6 pages.
Communication pursuant to Rules 161(2) and 162 EPC, EP Application No. 11862801.5, dated Nov. 8, 2013, 3 pages.
Taiwan Search Report, Taiwan Application No. 101145911, dated Nov. 17, 2014, 4 pages.
Non-Final Office Action for U.S. Appl. No. 13/976,707, dated Jun. 15, 2016, 51 pages.
Notice of Allowance for U.S. Appl. No. 14/170,397, dated Jun. 24, 2016, 17 pages.
Notice on Grant for CN Application No. 201180070598.6, dated Jun. 21, 2016, 4 pages.
Decision to Grant, JP Application No. 2014-502538, dated Mar. 24, 2015, 3 pages.
Notice of Allowance, U.S. Appl. No. 14/170,397, dated Jul. 29, 2016, 9 pages.
Notice of Allowance, TW Application No. 101145911, dated Apr. 30, 2015, 3 pages.
1st Office Action, CN Application No. 201180075835.8, dated Jan. 6, 2016, 10 pages.
Restriction Requirement, U.S. Appl. No. 13/976,707, dated Mar. 1, 2016, 7 pages.
Non-Final Office Action, U.S. Appl. No. 14/170,397, dated Feb. 10, 2016, 65 pages.
"Intel Architecture Software Developer's Manual vol. II Instruction Set Reference," first edition, Intel Corporation, 1997, pp. 2-1 to 2-6.
1st Office Action, JP Application No. 2015-087178, dated Mar. 22, 2016, 14 pages.
Kousaku Yoshida, "Instruction Set of SH7045F and Assembler Programming (Characteristics of Instructions of SH7045) and (Instruction Set of SH7045)," Transistor Technology SPECIAL, CQ Publishing Co., Ltd., Jan. 1, 2003, No. 81, pp. 43-53.
Notice of Allowance, KR Application No. 10-2013-7029045, dated Nov. 13, 2015, 3 pages.
Notice of Allowance, TW Application No. 103135824, dated Jul. 22, 2015, 4 pages.
2nd Office Action, CN Application No. 201180070598.6, dated Dec. 4, 2015, 6 pages.
Advisory Action from U.S. Appl. No. 13/976,707, dated Jan. 20, 2017, 7 pages.
Decision to Grant for Japanese Application No. 2015-087178, dated Nov. 8, 2016, with concise English-language explanation of relevance, 4 pages.
Final Office Action from U.S. Appl. No. 13/976,707 dated Oct. 6, 2016, 33 pages.
Extended European Search Report for Application No. 11862801.5, dated Apr. 28, 2017, 6 pages.
First Office Action and Search report from foreign counterpart Chinese Patent Application No. 201510464707, dated Mar. 2, 2017, 14 pages.
Non-Final Office Action from U.S. Appl. No. 13/976,707, dated Feb. 10, 2017, 19 pages.
Final Office Action from U.S. Appl. No. 13/976,707, dated Jul. 13, 2017, 19 pages.
Notice on Grant of Patent from foreign counterpart Chinese Patent Application No. 201510464707.2, dated Aug. 3, 2017, 4 pages.
Advisory Action from U.S. Appl. No. 13/976,707, dated Oct. 19, 2017, 4 pages.
Decision to Grant a Patent from foreign counterpart Japanese Patent Application No. 2016-237947, dated Mar. 13, 2018, 27 pages.
Intention to grant from foreign counterpart European Patent Application No. 11862801.5, dated Mar. 9, 2018, 131 pages.
First Office Action and Search Report from foreign counterpart Chinese Patent Application No. 201610804703.9, dated Apr. 2, 2018, 13 pages.
Non-Final Office Action from U.S. Appl. No. 13/976,707, dated May 16, 2018, 16 pages.

* cited by examiner

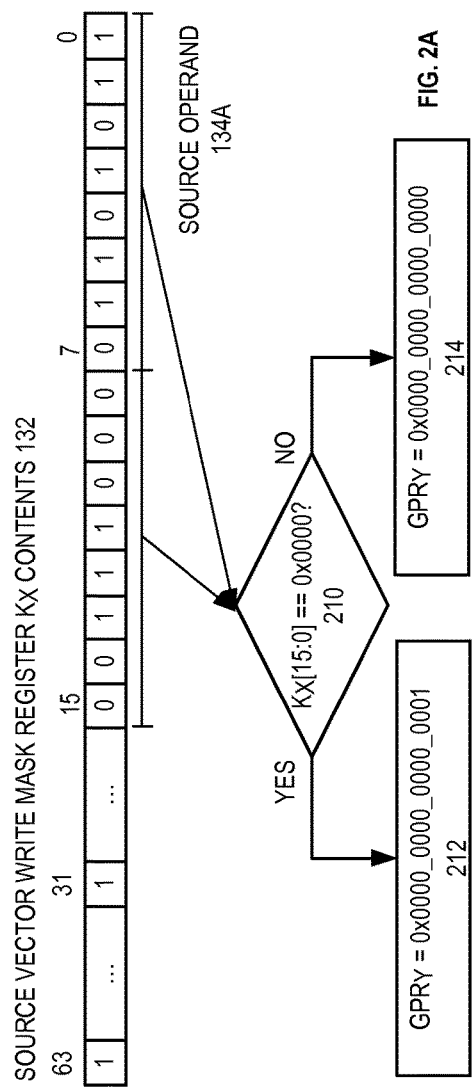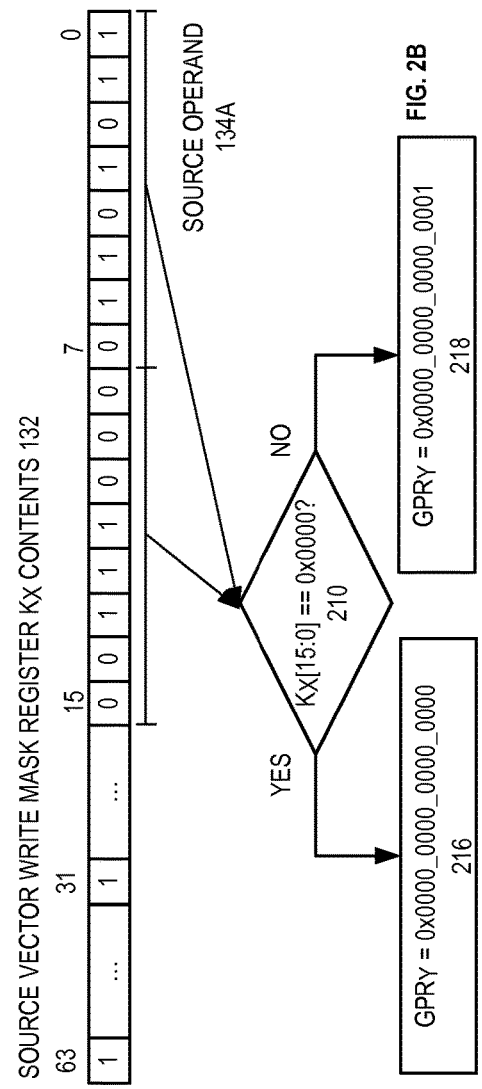

FETCHING AN OCCURRENCE OF AN INSTRUCTION, WHEREIN THE INSTRUCTION'S FORMAT SPECIFIES AS ITS ONLY SOURCE OPERAND A SOURCE OPERAND FROM A SINGLE VECTOR WRITE MASK REGISTER AND SPECIFIES AS ITS DESTINATION A SINGLE GENERAL PURPOSE REGISTER, WHEREIN THE INSTRUCTION'S FORMAT INCLUDES A FIRST FIELD WHOSE CONTENTS SELECTS THE SINGLE VECTOR WRITE MASK REGISTER FROM A PLURALITY OF ARCHITECTURAL VECTOR WRITE MASK REGISTERS, AND WHEREIN THE INSTRUCTION'S FORMAT INCLUDES A SECOND FIELD WHOSE CONTENTS SELECTS THE SINGLE GENERAL PURPOSE REGISTER FROM A PLURALITY OF ARCHITECTURAL GENERAL PURPOSE REGISTERS, AND WHEREIN THE SOURCE OPERAND IS A WRITE MASK INCLUDING A PLURALITY OF ONE BIT VECTOR WRITE MASK ELEMENTS THAT CORRESPOND TO DIFFERENT MULTI-BIT DATA ELEMENT POSITIONS WITHIN ARCHITECTURAL VECTOR REGISTERS 301

RESPONSIVE TO EXECUTING THE SINGLE OCCURRENCE OF THE SINGLE INSTRUCTION, STORING DATA IN THE SINGLE GENERAL PURPOSE REGISTER SUCH THAT ITS CONTENTS REPRESENT EITHER A FIRST OR SECOND SCALAR CONSTANT BASED ON WHETHER THE PLURALITY OF ONE BIT VECTOR WRITE MASK ELEMENTS IN THE SOURCE OPERAND ARE ALL ZERO OR NOT 302

FIG. 3

PERFORMING A LOGICAL OR OPERATION ON THE PLURALITY OF ONE BIT VECTOR WRITE MASK ELEMENTS IN THE SOURCE OPERAND 401

MULTIPLEXING EITHER THE FIRST OR SECOND SCALAR CONSTANT BASED ON A CONTROL SIGNAL FORMED FROM THE RESULT OF THE LOGICAL OR OPERATION AND AN INDICATION OF WHICH ONE OF A PLURALITY OF TYPES THE INSTRUCTION IS 402

FIG. 4

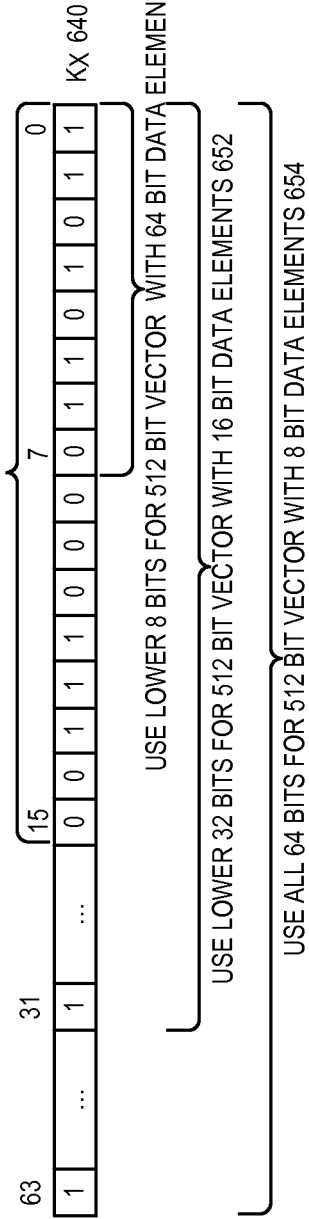

FIG. 8A
```
IF (Kx[7:0]==0])
    DEST=1
ELSE
    DEST=0
ENDIF
```

FIG. 8B
```
IF (Kx[15:0]==0])
    DEST=1
ELSE
    DEST=0
ENDIF
```

FIG. 8C
```
IF (Kx[31:0]==0])
    DEST=1
ELSE
    DEST=0
ENDIF
```

FIG. 8D
```
IF (Kx[63:0]==0])
    DEST=1
ELSE
    DEST=0
ENDIF
```

FIG. 9A
```
IF (Kx[7:0]==0])
    DEST=0
ELSE
    DEST=1
ENDIF
```

FIG. 9B
```
IF (Kx[15:0]==0])
    DEST=0
ELSE
    DEST=1
ENDIF
```

FIG. 9C
```
IF (Kx[31:0]==0])
    DEST=0
ELSE
    DEST=1
ENDIF
```

FIG. 9D
```
IF (Kx[63:0]==0])
    DEST=0
ELSE
    DEST=1
ENDIF
```

```
VMOVAPS ymm1, A
VCMPPS ymm0, ymm1, B, LT
VPTEST ymm0, ymm0  // set ZF if ymm0 all zeroes
JZ   out
   foo(A, B, 1)
       jmp end
Out:
   foo(A, B, 0)
End:
```

FIG. 10A

```
VMOVAPS ymm1, A
VCMPPS k1, ymm1, B
KSETZW rax, k1   // set rax to 1 if k1 is all zeroes
foo(A, B, rax)
```

FIG. 10B

```
VMOVAPS ymm1, A
VCMPPS ymm0, ymm1, B, LT
VPTEST ymm0, ymm0  // set ZF if ymm0 all zeroes
JZ   out
   LEA rbx,foo
   (*rbx) (A[], B[], C[])
       jmp end
Out:
   LEA rbx, foo+8
   (*rbx) (A[], B[], C[]+size)
End:
```

FIG. 11A

```
VMOVAPS ymm1, A
VCMPPS k1, ymm1, B
KSETZW rax, k1   // set rax to 1 if k1 is all zeroes
LEA rbx,     foo+rax*8
IMUL rax, size
(*rbx)(A[], B[], C[]+rax )
```

FIG. 11B

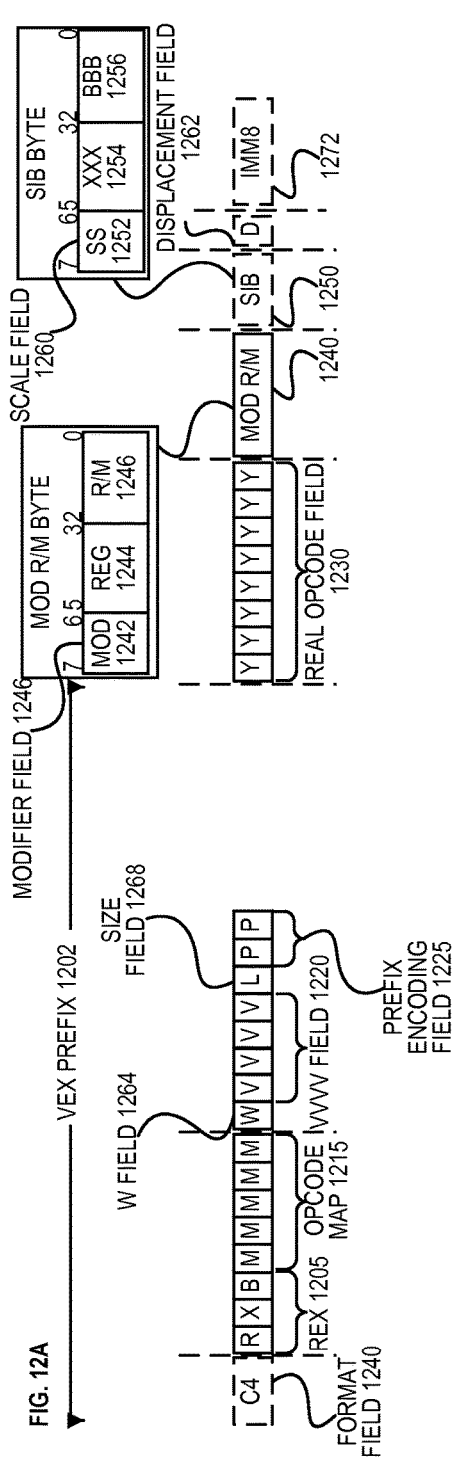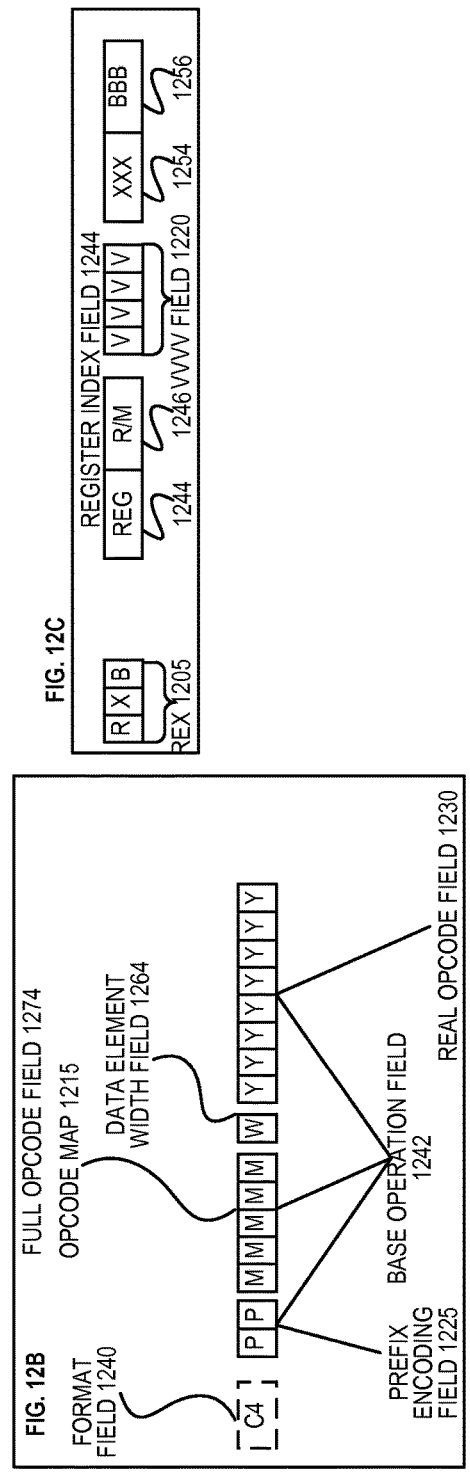

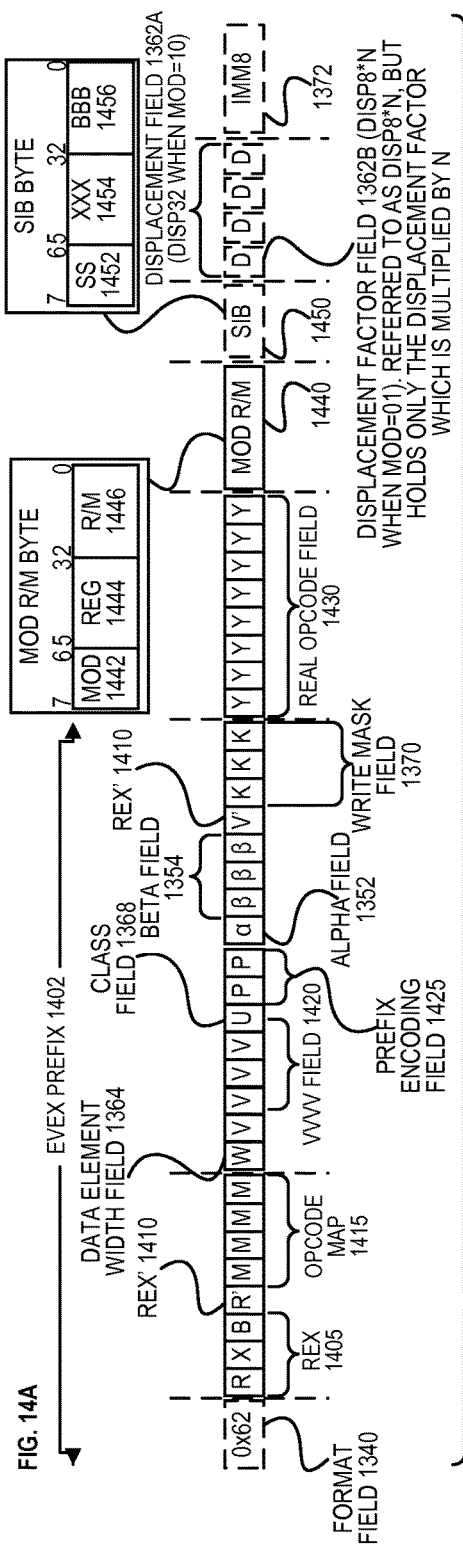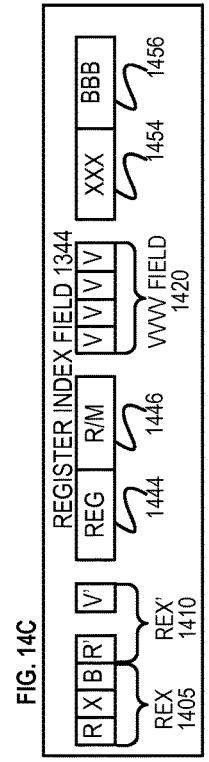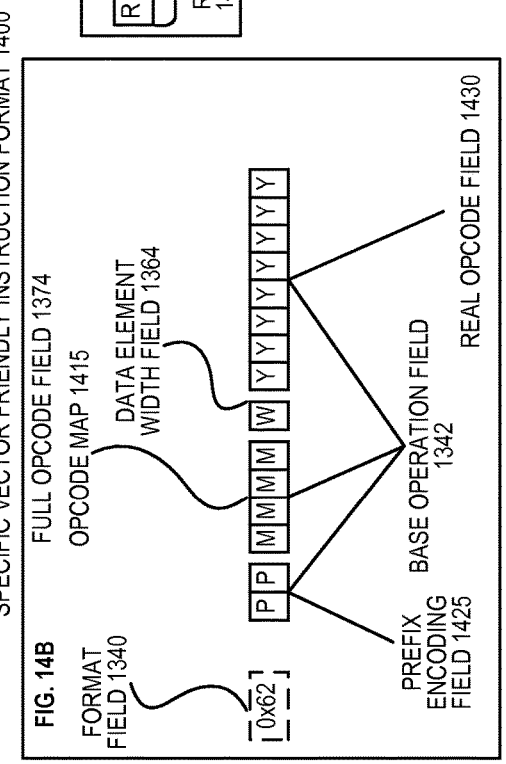
FIG. 14A
FIG. 14B
FIG. 14C

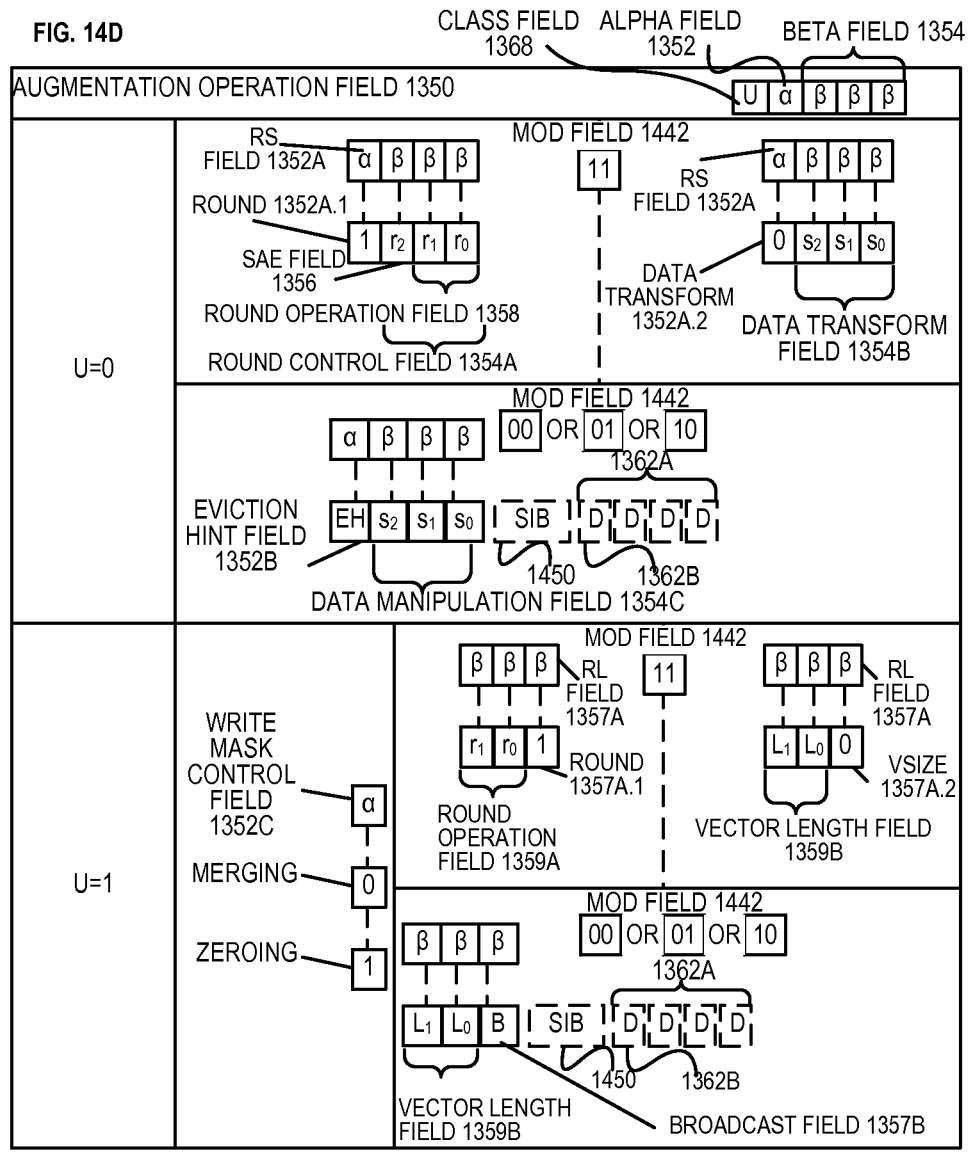

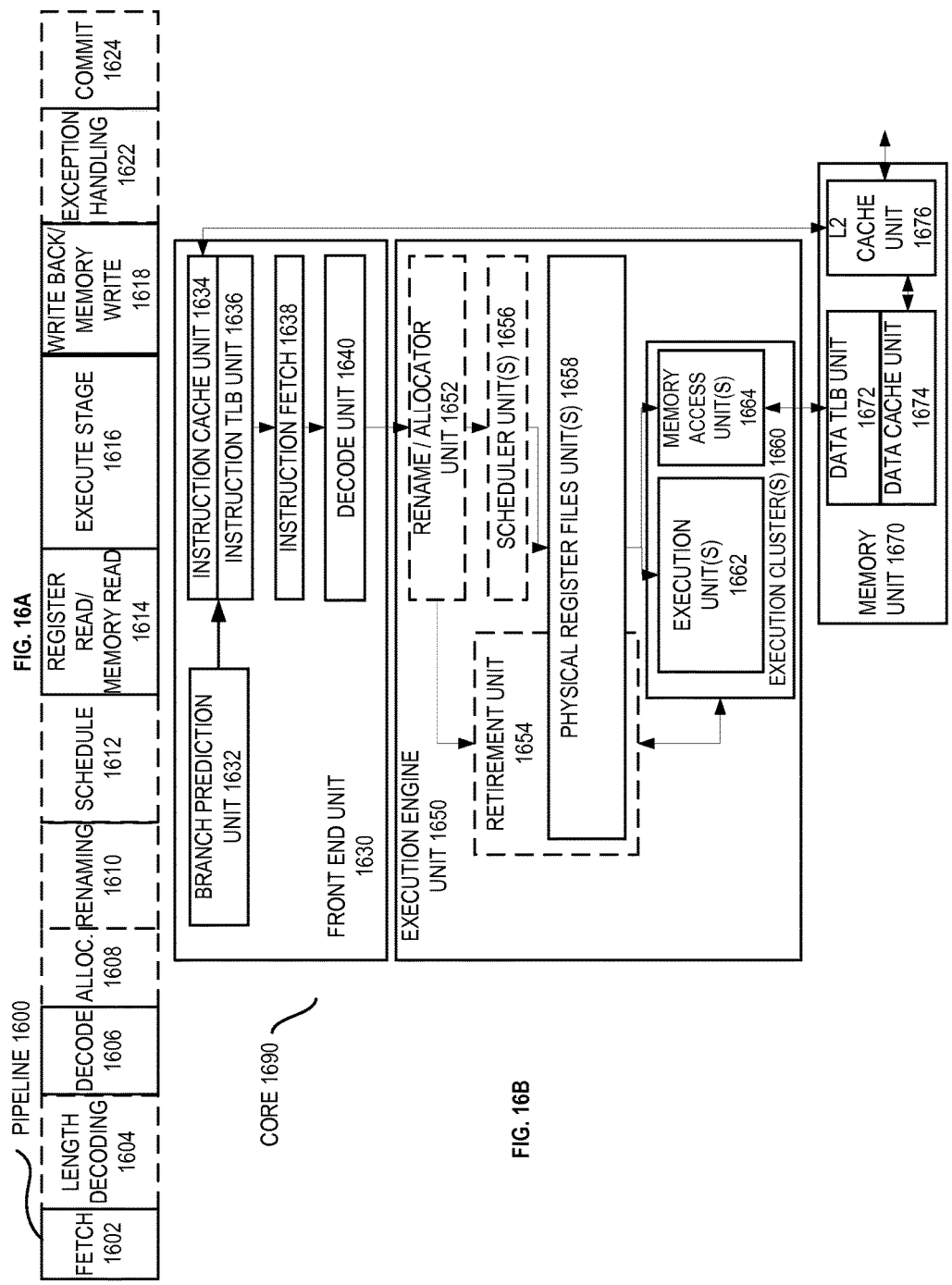

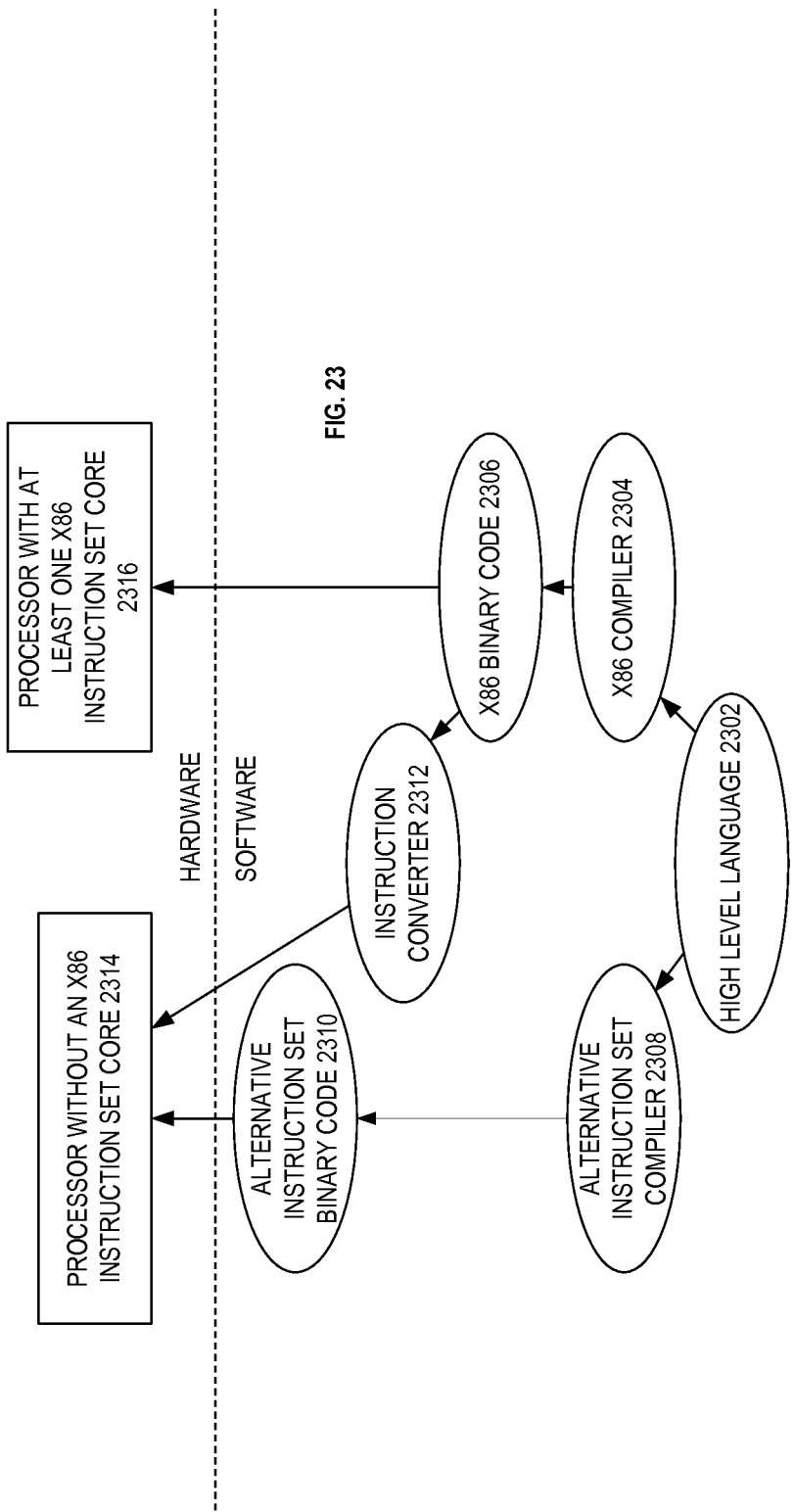

INSTRUCTIONS FOR STORING IN GENERAL PURPOSE REGISTERS ONE OF TWO SCALAR CONSTANTS BASED ON THE CONTENTS OF VECTOR WRITE MASKS

CROSS-REFERENCE TO RELATED APPLICATION

This patent application is a U.S. National Phase Application under 35 U.S.C. § 371 of International Application No. PCT/US2011/066998, filed Dec. 22, 2011, entitled "INSTRUCTIONS FOR STORING IN GENERAL PURPOSE REGISTERS ONE OF TWO SCALAR CONSTANTS BASED ON THE CONTENTS OF VECTOR WRITE MASKS."

FIELD

Embodiments of the invention relate to the field of processors; and more specifically, to instructions for setting scalar values in general purpose registers based on write mask contents.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-ops—that result from a processor's decoder decoding macro-instructions).

The instruction set architecture is distinguished from the microarchitecture, which is the internal design of the processor implementing the ISA. Processors with different microarchitectures can share a common instruction set. For example, Intel Pentium 4 processors, Intel Core processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different micro-architectures using well known techniques, including dedicated physical registers, one or more dynamically allocated physical registers using a register renaming mechanism (e.g., the use of a Register Alias Table (RAT), a Reorder Buffer (ROB) and a retirement register file; the use of multiple maps and a pool of registers), etc. Unless otherwise specified, the phrases register architecture, register file, and register refer to that which is visible to the software/programmer and the manner in which instructions specify registers. Where specificity is desired, the adjective logical, architectural, or software visible will be used to indicate registers/files in the register architecture, while different adjectives will be used to designate registers in a given micro-architecture (e.g., physical register, reorder buffer, retirement register, register pool).

An instruction set includes one or more instruction formats. A given instruction format defines various fields (number of bits, location of bits) to specify, among other things, the operation to be performed (operand) and the operand(s) on which that operation is to be performed. Thus, each instruction of an ISA is expressed using a given instruction format and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction.

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of SIMD extensions, referred to the Advanced Vector Extensions (AVX) (AVX1 and AVX2) and using the VEX coding scheme, has been released and/or published (e.g., see Intel® 64 and IA-32 Architectures Software Developers Manual, October 2011; and see Intel® Advanced Vector Extensions Programming Reference, June 2011).

BRIEF DESCRIPTION OF THE DRAWINGS

The invention may best be understood by referring to the following description and accompanying drawings that are used to illustrate embodiments of the invention. In the drawings:

FIG. 2A is a block diagram illustrating an example with regard to a specific "set GPR if mask is zero" instruction according to one embodiment of the invention;

FIG. 2B is a block diagram illustrating an example with regard to a specific "set GPR if mask is not zero" instruction according to one embodiment of the invention;

FIG. 3 is a flow diagram for processing each occurrence of instructions for storing in general purpose registers one of two scalar constants based on the contents of vector write masks according to certain embodiments of the invention;

FIG. 4 is a flow diagram for executing occurrences of instructions for storing in general purpose registers one of two scalar constants based on the contents of vector write masks according to certain embodiments of the invention;

FIG. 6A is a table illustrating that the number of one bit vector write mask elements depends upon the vector size and the data element size according to one embodiment of the invention;

FIG. 6B is a diagram illustrating a vector write mask register 640 and the bit locations used as a write mask depending on the vector size and the data element size according to one embodiment of the invention;

FIG. 8A illustrates pseudo code for a "set GPR if mask is zero" instruction (KSETZB $GPR_Y$, $K_X$) that uses a source operand 134 size of 8 bits according to certain embodiments of the invention;

FIG. 8B illustrates pseudo code for a "set GPR if mask is zero" instruction (KSETZW $GPR_Y$, $K_X$) that uses a source operand 134 size of 16 bits according to certain embodiments of the invention;

FIG. 8C illustrates pseudo code for a "set GPR if mask is zero" instruction (KSETZD $GPR_Y$, $K_X$) that uses a source operand 134 size of 32 bits according to certain embodiments of the invention;

FIG. 8D illustrates pseudo code for a "set GPR if mask is zero" instruction (KSETZQ $GPR_Y$, $K_X$) that uses a source operand 134 size of 64 bits according to certain embodiments of the invention;

FIG. 9A illustrates pseudo code for a "set GPR if mask is not zero" instruction (KSETNZB $GPR_Y$, $K_X$) that uses a source operand 134 size of 8 bits according to certain embodiments of the invention;

FIG. 9B illustrates pseudo code for a "set GPR if mask is not zero" instruction (KSETNZW $GPR_Y$, $K_X$) that uses a source operand 134 size of 16 bits according to certain embodiments of the invention;

FIG. 9C illustrates pseudo code for a "set GPR if mask is not zero" instruction (KSETNZD $GPR_Y$, $K_X$) that uses a source operand 134 size of 32 bits according to certain embodiments of the invention;

FIG. 9D illustrates pseudo code for a "set GPR if mask is not zero" instruction (KSETNZQ $GPR_Y$, $K_X$) that uses a source operand 134 size of 64 bits according to certain embodiments of the invention;

FIG. 10A illustrates an exemplary code sequence written in AVX1/AVX2 instructions that passes parameters to a function;

FIG. 10B illustrates an exemplary code sequence written with a KSETZW instruction that passes parameters to a function according to one embodiment of the invention;

FIG. 11A illustrates an exemplary code sequence written in AVX1/AVX2 instructions that uses pointers and an indirect function call;

FIG. 11B illustrates an exemplary code sequence written with a KSETZW instruction that uses a pointer and an indirect function call according to one embodiment of the invention;

FIG. 12A provides a representation of the VEX C4 encoding;

FIG. 12B illustrates which fields from FIG. 12A make up a full opcode field 1274 and a base operation field 1242;

FIG. 12C illustrates which fields from FIG. 12A make up a register index field 1244;

FIG. 14A is a block diagram illustrating an exemplary specific vector friendly instruction format according to embodiments of the invention;

FIG. 14B is a block diagram illustrating the fields of the specific vector friendly instruction format 1400 that make up the full opcode field 1374 according to one embodiment of the invention;

FIG. 14C is a block diagram illustrating the fields of the specific vector friendly instruction format 1400 that make up the register index field 1344 according to one embodiment of the invention;

FIG. 14D is a block diagram illustrating the fields of the specific vector friendly instruction format 1400 that make up the augmentation operation field 1350 according to one embodiment of the invention;

FIG. 16A is a block diagram illustrating both an exemplary in-order pipeline and an exemplary register renaming, out-of-order issue/execution pipeline according to embodiments of the invention;

FIG. 16B is a block diagram illustrating both an exemplary embodiment of an in-order architecture core and an exemplary register renaming, out-of-order issue/execution architecture core to be included in a processor according to embodiments of the invention;

FIG. 23 is a block diagram contrasting the use of a software instruction converter to convert binary instructions in a source instruction set to binary instructions in a target instruction set according to embodiments of the invention.

DESCRIPTION OF EMBODIMENTS

Figure 1:
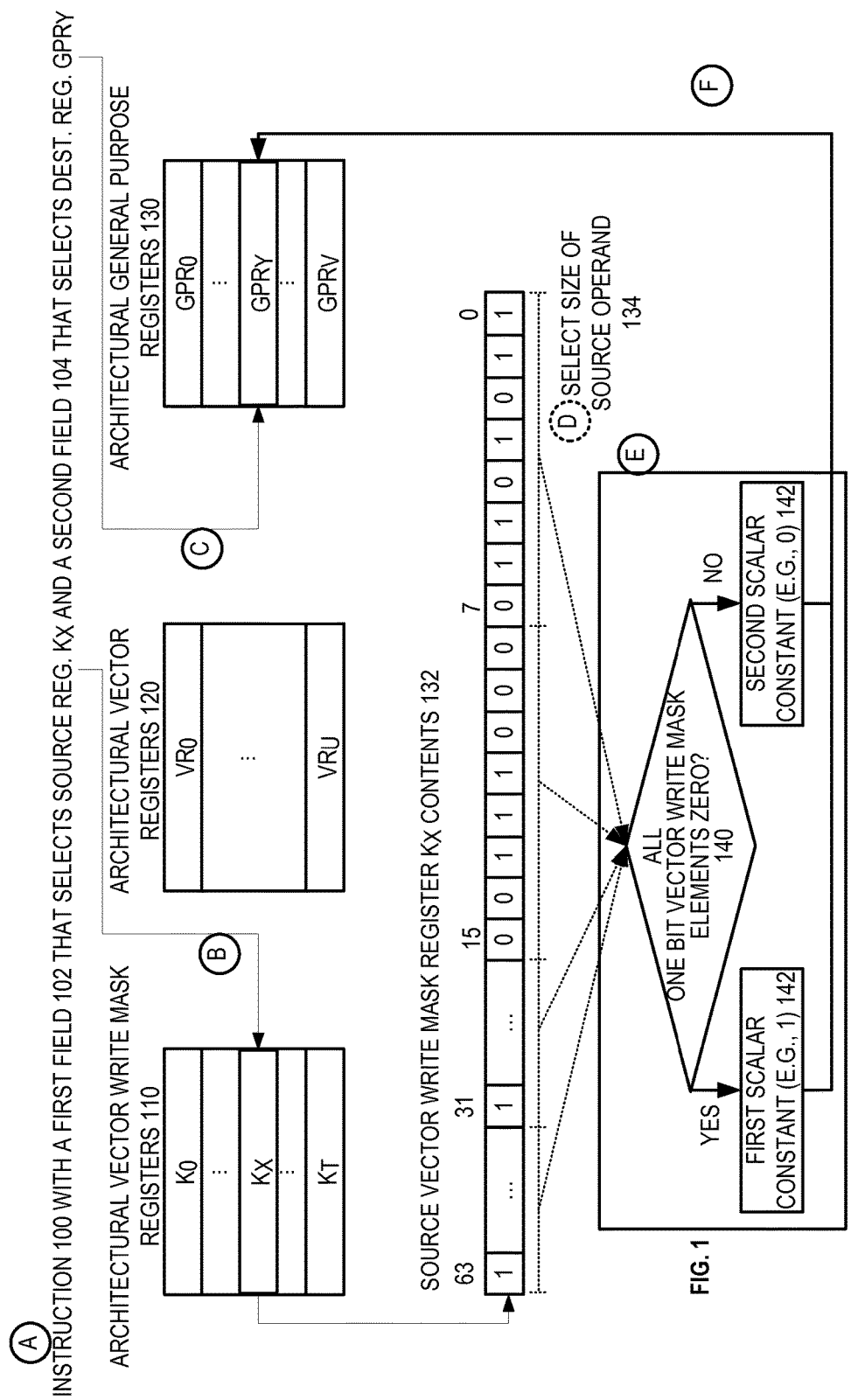
FIG. 1 is a block diagram illustrating the operation of exemplary instructions for storing in general purpose registers one of two scalar constants based on vector write masks according to certain embodiments of the invention.

In the following description, numerous specific details such as logic implementations, opcodes, ways to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

It should also be appreciated that references to "one embodiment", "an embodiment", or "one or more embodiments", for example, mean that a particular feature may be included in the practice of embodiments of the invention, but every embodiment may not necessarily include the particular feature. Similarly, it should be appreciated that various features are sometimes grouped together in a single embodiment, figure, or description thereof for the purpose of streamlining the disclosure and aiding in the understanding of various inventive aspects. Further, when a particular feature, structure, or characteristic is described in connection with an embodiment, it is submitted that it is within the knowledge of one skilled in the art to effect such feature, structure, or characteristic in connection with other embodiments whether or not explicitly described. This method of disclosure, however, is not to be interpreted as reflecting an intention that more features than are expressly recited in each claim are required. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagrams will be described with reference to the exemplary embodiments of the block diagrams. However, it should be understood that the operations of flow diagrams can be performed by embodiments of the invention other than those discussed with reference to the block diagrams, and the embodiments discussed with reference to the block diagrams can perform operations different than those discussed with reference to the flow diagrams.

To ease understanding, dashed lines have been used in the figures to signify the optional nature of certain items (e.g., features not supported by a given implementation of the invention; features supported by a given implementation, but used in some situations and not in others).

Overview

FIG. 1 is a block diagram illustrating the operation of exemplary instructions for storing in general purpose registers one of two scalar constants based on vector write masks according to certain embodiments of the invention. FIG. 1 illustrates architectural vector write mask registers 110, architectural vector registers 120, and architectural general purpose registers 130.

The vector registers 120, which are individually designated VRz where z can be a value from 0 to U, are used to store vector operands. The instruction set architecture includes at least some SIMD instructions that specify vector operations and that have fields to select source registers and/or destination registers from these vector registers 120 (an exemplary SIMD instruction may specify a vector operation to be performed on the contents of one or more of the vector registers 120, and the result of that vector operation to be stored in one of the vector registers 120). Different embodiments of the invention may have different sized vector registers and support more/less/different sized data elements. The size of the multi-bit data elements specified by a SIMD instruction (e.g., byte, word, double word, quad word) determines the bit locations of the "data element positions" within a vector register, and the size of the vector operand determines the number of data elements. In other words, depending on the size of the data elements in the destination operand and the size of the destination operand (the total number of bits in the destination operand) (or put another way, depending on the size of the destination operand and the number of data elements within the destination operand), the bit locations of the multi-bit data element positions within the resulting vector operand change (e.g., if the destination for the resulting vector operand is a vector register, then the bit locations of the multi-bit data element positions within the destination vector register change). For example, the bit locations of the multi-bit data elements are different between a vector operation that operates on 32-bit data elements (data element position 0 occupies bit locations 31:0, data element position 1 occupies bit locations 63:32, and so on) and a vector operation that operates on 64-bit data elements (data element position 0 occupies bit locations 63:0, data element position 1 occupies bit locations 127:64, and so on). This is described in more detail later herein.

The vector write mask registers 110, which are individually designated $K_X$ where x can range from 0 to T, are used to store write masks that include a plurality of one bit vector write mask elements that correspond to different multi-bit data element positions within the destination vector operand. At least some of the above described SIMD instructions include a field to select a write mask from the vector write mask registers 110, and the one bit vector write mask elements of the selected write mask control which of the data element positions in the destination vector operand reflect the result of the vector operation. Since, as described above, the bit locations of the multi-bit data elements of the destination operands change in embodiments supporting vector operations that operate on different sized data elements (e.g., the bit locations of the multi-bit data elements are different between a vector operation that operates on 32-bit data elements and a vector operation that operates on 64-bit data elements), such embodiments may support different relationships (also referred to as correspondences or mappings) of the one bit write mask elements to bit locations within the destination operand; thus, as the bit locations with the destination operand change, the mapping of one bit vector write mask elements change.

The general purpose registers 130, which are individually designated $GPR_Y$ where Y can range from 0 to V, are used to store operands for logical operations, arithmetic operations, address calculations, and memory pointers. The instruction set architecture includes scalar instructions that specify scalar operations to be performed on the contents of registers within the general purpose registers 130. The differences between the general purpose registers 130 and the vector registers 120 may vary between different embodiments of the invention (e.g., different total number of vector registers relative to general purpose registers; different size of vector registers as compared to general purpose registers; vector registers may store data in both integer formats and floating-point formats, while the general purpose registers only store data in integer formats), examples of which are described in more detail later herein.

While the number of registers in each of the vector write mask registers 110, vector registers 120, and general purpose registers 130 are respectively designated as T, U, and V, one or more of these register files may have the same number of registers. In one embodiment, the value of a given vector write mask register can be set up a variety of ways, including as a direct result of a vector comparison instruction, transferred from a GPR, or calculated as a direct result of a logical operation between two masks.

In this figure, circled letters are used to indicate an order for reading the items illustrated to ease understanding, and in some cases to indicate relationships between those items. At circled A there is an instruction 100 having a format that includes a first field 102 whose contents selects a source register $K_X$ and a second field 104 whose contents selects a destination register $GPR_Y$. The instruction 100 belongs to an instruction set architecture, and each "occurrence" of the instruction 100 within an instruction stream would include values within the first field 102 and the second field 104 that respectively select specific ones of the architectural vector write mask registers 110 and architectural general purpose registers 130.

A circled B represents the selection of $K_X$ as the source vector write mask register from the vector write mask registers 110. FIG. 1 separately illustrates a specific example of the selected source vector write mask register's contents 132 in which the vector write mask registers are 64-bit registers and in which exemplary values are illustrated for the bit locations 0:15, 31, and 63.

Similarly, a circled C illustrates the selection of $GPR_Y$ as the destination general purpose register within the general purpose registers 130.

At dashed circle D, a source operand 134 is selected from the contents of the source vector write mask register $K_X$. A dotted line with hash marks at different bit positions within the source vector write mask register (specifically, the hash marks are between bit positions 7:8, 15:16, and 31:32) illustrates that in some embodiments of the invention the size of the source operand 134 is selectable. Different ones of the embodiments that allow for selection of different sized ones of the source operand 134 may control this selection in a variety of ways (e.g., using different opcodes, using a value from one of the general purpose registers). Of course, alternative embodiments of the invention may support different sized vector write mask registers and/or different/ more/less selection sizes for the source operand 134. Further, some embodiments of the invention may only support a source operand that includes the entire contents of the selected vector write mask register (the source operand 134 is always the same size as the selected vector write mask register).

At circled E, the source operand 134 is operated on to produce a scalar constant (this scalar constant is referred to as the destination operand or result). Circled E includes a first block 140 in which it is determined whether all of the one bit vector write mask elements of the source operand are 0. If so, a first scalar constant (e.g., 1) is output (block 142); otherwise, a second scalar constant (e.g., 0) is output (block 142).

At circled F, the result (be it the first scalar constant or the second scalar constant) is written back to the general purpose register $GPR_Y$. Since this is a scalar result and it is being written back to a general purpose register, in some embodiments the entire contents of that multi-bit general purpose register will represent either the first scalar constant (e.g., 00 . . . 1) or the second scalar constant (e.g., 00 . . . 0)

based on whether the plurality of one bit write mask elements in the source operand are all 0 or not.

As described in more detail below, the instruction 100 may be implemented such that the two scalar constants are the Boolean values of 1 and 0. As such, a Boolean value is stored in the selected GPR (in other words, the multiple bits of the selected GPR will collectively represent either a 1 or 0) based on whether all of the bits of the vector write mask are all zero or not. In this Boolean case, the instruction 100 is referred to a "set GPR if mask is P" instruction, where K may be zero or not zero. As such, a Boolean value is generated based on the control flow information intrinsic to a vector write mask in an ISA. By placing the Boolean value in a GPR as opposed to a control flow register (e.g., a carry flag), decisions based on the Boolean value may be data flow based as opposed to control flow based. Specifically, control flow based decisions rely on instructions that change the flow of execution (jump, branch, etc.), whereas data flow decisions select between data based on the Boolean value. For example, set GPR if mask is P instructions are useful for parameter passing in functions (see FIGS. 11A-B), and for efficient pointer generation and indirect function calls for fast conditional execution of different pieces of code (see FIGS. 12A-B).

While FIG. 1 illustrates a single instruction 100 that will store in a general purpose register one of two scalar constants based on the contents of a vector write mask, it should be understood that the instruction set architecture may include multiple such instructions that specify similar operations but with different criteria (e.g., select different sizes of source operands, select between different scalar constants, store the opposite scalar constant when all of the one bit vector write mask elements are 0) as described later herein. While in some embodiments of the invention the instruction 100 as illustrated specifies as its only source operand a source operand from a single one of the vector write mask registers 110 and specifies as its only destination a single one of the general purpose registers 130, other embodiments of the invention may include additional sources (e.g., data used for memory access calculations), a different type of destination (e.g., a memory location as opposed to a register), and/or additional source operand(s) and destination(s) (e.g., an instruction that also stores the result in a condition code flag, an instruction that causes a separate operation to be performed on the additional source operand(s) whose result is stored in the additional destination(s)).

Exemplary "Set GPR if Mask is Zero" and "Set GPR if Mask is not Zero" Instructions FIG. 2A is a block diagram illustrating an example with regard to a specific "set GPR if mask is zero" instruction according to one embodiment of the invention; while FIG. 2B is a block diagram illustrating an example with regard to a specific "set GPR if mask is not zero" instruction according to one embodiment of the invention. Both FIGS. 2A and 2B show the source vector write mask register $K_X$ contents 132. Also both figures show a source operand 134A that is bits 15:0 of bits 63:0 in the source vector write mask register $K_X$, as opposed to all of the bits of the source vector write mask register $K_X$. In addition, both figures include a determination of whether all of the one bit vector write mask elements of the write mask in the source operand 134A are zero. In FIG. 2A, if all of bits of the source operand 134A are zero, control passes to block 212 where $GPR_Y$ is made to equal the scalar constant 1; otherwise, control passes to block 214 where $GPR_Y$ is made to equal the scalar constant 0. Turning to block 210 of FIG. 2B, if all of bits of the source operand 134A are zero, control passes to block 216 where $GPR_Y$ is made to equal the scalar constant 0; otherwise, control passes to block 218 where $GPR_Y$ is made to equal the scalar constant 1.

In some embodiments of the invention, the "set GPR if mask is zero" instruction type is referred to as KSETZ {B, W, D, Q} $GPR_Y$, $K_X$ (where the { } indication selectable source operand 134 sizes), and the "set GPR if mask is not zero" instruction type is referred to as KSETNZ {B, W, D, Q} $GPR_Y$, $K_X$.

Exemplary Flows and Processor Core

FIG. 3 is a flow diagram for processing each occurrence of instructions for storing in general purpose registers one of two scalar constants based on the contents of vector write masks according to certain embodiments of the invention. In block 301, an occurrence of such an instruction is fetched. The instruction's format specifies as its only source operand a source operand from a single vector write mask register and specifies as its destination a single general purpose register. The instruction's format includes a first field whose contents selects the single vector write mask register from a plurality of architectural vector write mask registers; and the instruction's format includes a second field whose contents selects the single general purpose register from a plurality of architectural general purpose registers. The source operand is a write mask including a plurality of one bit vector write mask elements that correspond to different multi-bit data element positions within architectural vector registers. From block 300, control passes to block 302.

At block 302, responsive to executing the single occurrence of the single instruction from block 301, data is stored in the single general purpose register such that its contents represent either a first or second scalar constant based on whether the plurality of one bit vector write mask elements are all zero or not. See FIGS. 2A and 2B for examples of scalar constants that may be selected and which scalar constant to select based on whether the plurality of one bit vector write mask elements are all zero or not.

FIG. 4 is a flow diagram for executing occurrences of instructions for storing in general purpose registers one of two scalar constants based on the contents of vector write masks according to certain embodiments of the invention. As shown in block 401, a logical OR operation is performed on the plurality of one bit vector write mask elements of the source operand of an occurrence of one such instruction. In order to support different source operand sizes, a set of OR trees connected by multiplexors may be used (the least significant bits making up the smallest size source operand are an input to a first OR tree, the output of this first OR tree is an input to an OR gate, the other input to this OR gate is the output of a multiplexor, the inputs to this multiplexer are 0 and the output of a second OR tree, the inputs to the second OR tree are the next most significant bits making up the next size of source operand, the multiplexer is controlled by a signal to indicate whether the smallest size source operand or a larger sized source operand is being used; this can be scaled to include additional sizes of source operands. From block 401, control passes to block 402. In block 402, either the first or second scalar constant is multiplexed based on a control signal formed from the result of the logical OR operation and an indication of which one of a plurality of types the instruction is. For example, one such type may be the "set GPR if vector write mask is zero" type from FIG. 2A and another such type may be the "set GPR if vector write mask is not zero" type from FIG. 2B. By way of further example, if the "set GPR if vector write mask is zero" and "set GPR if vector write mask is not zero" types are respectively represented by a "type signal" of logical 1 and 0, this type signal may be EXCLUSIVELY ORed (also referred to as XORed or a logical exclusive OR operation) with the result of the logical OR of the source operand to form the control signal; which control signal is provided to a multiplexer that selects between the two scalar constants. In this embodiment, these two scalar constants are hardwired to be 1 and 0; and in such an embodiment, a control signal of logic 1 selects the hardwired scalar constant 1, and a control signal of logic 0 selects the hardwired scalar constant 0. While specific discrete logic is described with reference to FIG. 4, it should be understand that different embodiments may use different logic (e.g., may flip the logical value assignment to the different types of instructions and flip the multiplexor inputs).

Figure 5:
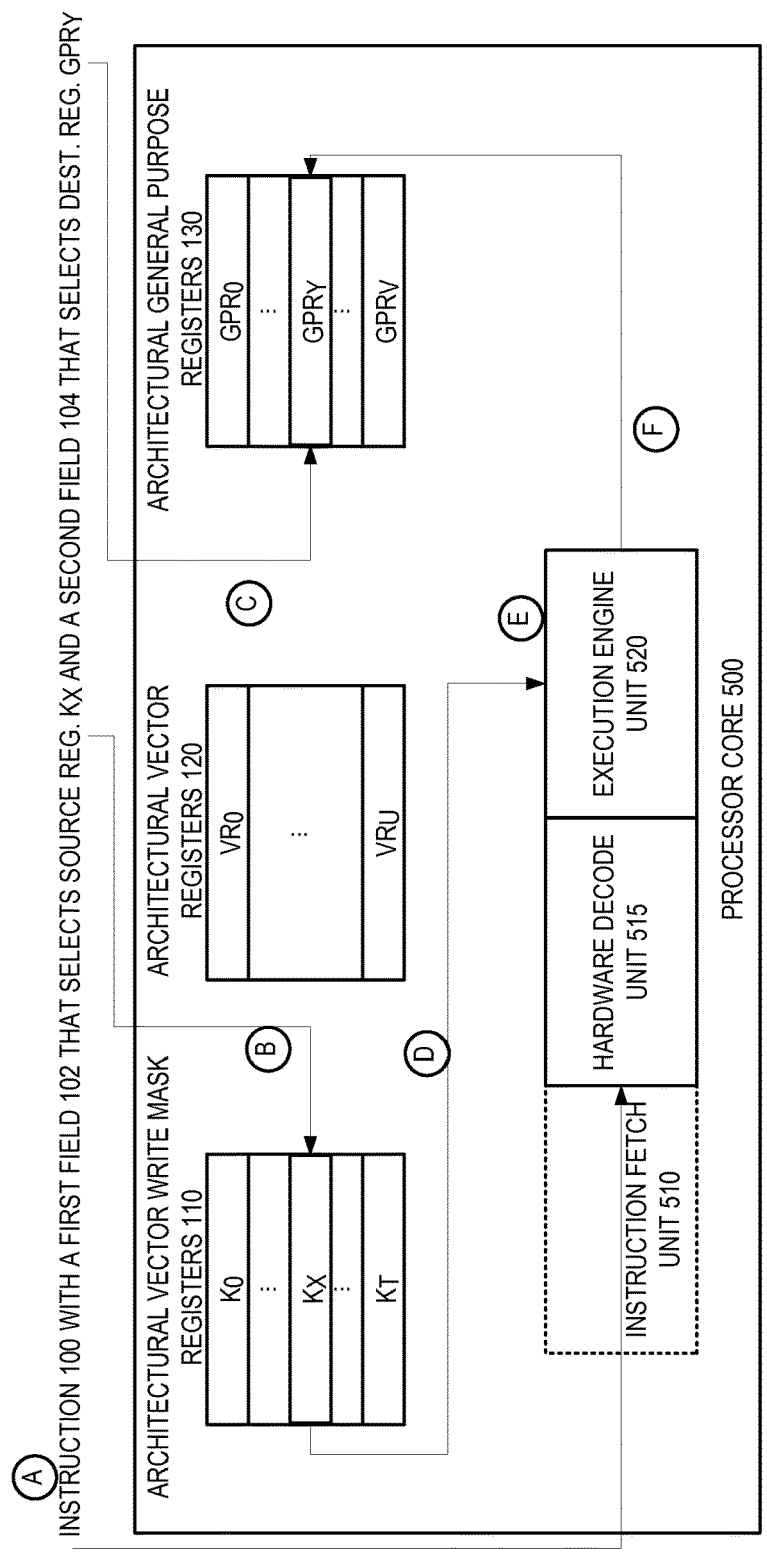
FIG. 5 is a block diagram of a specific machine for processing occurrences of instructions for storing in general purpose registers one of two scalar constants based on the contents of vector write masks according to certain embodiments of the invention.

FIG. 5 is a block diagram of a specific machine for processing occurrences of instructions for storing in general purpose registers one of two scalar constants based on the contents of vector write masks according to certain embodiments of the invention. FIG. 5 duplicates the instruction 100, vector write mask registers 110, vector registers 120, general purpose registers 130, and circled B-C from FIG. 1. FIG. 5 also illustrates a processor core 500 including an optional instruction fetch unit 510, a hardware decode unit 515, and an execution engine unit 520, as well as the vector write mask registers 110, vector registers 120, and general purpose registers 130.

At circled A in FIG. 5, occurrences of the instruction 100 (or different types of instructions that store in general purpose registers one of two scalar constants based on the contents of vector write masks) is provided to the hardware decode unit 515 (optionally as a result of the instruction fetch unit 510 fetching the instruction 100). A variety of different well known decode units could be used for decode unit 515. For example, the decode unit may decode each macro instruction into a single wide micro instruction. As another example, the decode unit may decode some macro instructions into single wide micro instructions, but others into multiple wide micro instructions. As another example particularly suited for out of order processor pipelines, the decode unit may decode each macro instruction into one or more micro-ops, where each of the micro-ops may be issued and execute out of order. Also, the decode unit may be implemented with one or more decoders and each decoder may be implemented as a programmable logic array (PLA), as is well known in the art. By way of example, a given decode unit may: 1) have steering logic to direct different macro instructions to different decoders; 2) a first decoder that may decode a subset of the instruction set (but more of it than the second, third, and fourth decoders) and generate two micro-ops at a time; 3) a second, third, and fourth decoder that may each decode only a subset of the entire instruction set and generate only one micro-op at a time; 4) a micro-sequencer ROM that may decode only a subset of the entire instruction set and generate four micro-ops at a time; and 5) multiplexing logic feed by the decoders and the micro-sequencer ROM that determine whose output is provided to a micro-op queue. Other embodiments of the decode unit may have more or less decoders that decode more or less instructions and instruction subsets. For example, one embodiment may have a second, third, and fourth decoder that may each generate two micro-ops at a time; and may include a micro-sequencer ROM that generates eight micro-ops at a time.

At circled D, the architectural vector write mask register providing the source operand is accessed (this may be through a dedicated physical register, a renamed physical register, a bypass path if the contents were just generated, etc.) and the source operand is provided to the execution engine unit 520, which at circled E executes occurrences of the instruction 100 in an instruction stream. Specifically, responsive to each of the occurrences, the execution engine unit 520 is to determine whether the plurality of one bit vector write mask elements of that occurrence's source operand are all zero or not, and to cause data to be stored in that occurrence's single selected general purpose register such that its contents represent either a first or second scalar constant based on the determination. The execution engine unit 520 may be implemented in a variety of ways, including the logic described above with reference to FIG. 4.

At circled F, the result (be it the first scalar constant or the second scalar constant) is written back to the architectural general purpose register $GPR_Y$ (this may be written to a dedicated physical register, a renamed physical register, etc.). Since this is a scalar result and it is being written back to a general purpose register, the contents of that general purpose register will represent either the first scalar constant or the second scalar constant based on whether the plurality of one bit write mask elements in the source operand are all 0 or not.

Exemplary Correspondences and Vector Write Mask Operations

FIG. 6A is a table illustrating that the number of one bit vector write mask elements depends upon the vector size and the data element size according to one embodiment of the invention. Vector sizes of 128-bits, 256-bits, and 512-bits are shown, although other widths are also possible. Data element sizes of 8-bit bytes (B), 16-bit words (W), 32-bit doublewords (D) or single precision floating point, and 64-bit quadwords (Q) or double precision floating point are considered, although other widths are also possible. As shown, when the vector size is 128-bits, 16-bits may be used for masking when the vector's data element size is 8-bits, 8-bits may be used for masking when the vector's data element size is 16-bits, 4-bits may be used for masking when the vector's data element size is 32-bits, and 2-bits may be used for masking when the vector's data element size is 64-bits. When the vector size is 256-bits, 32-bits may be used for masking when the packed data element width is 8-bits, 16-bits may be used for masking when the vector's data element size is 16-bits, 8-bits may be used for masking when the vector's data element size is 32-bits, and 4-bits may be used for masking when the vector's data element size is 64-bits. When the vector size is 512-bits, 64-bits may be used for masking when the vector's data element size is 8-bits, 32-bits may be used for masking when the vector's data element size is 16-bits, 16-bits may be used for masking when the vector's data element size is 32-bits, and 8-bits may be used for masking when the vector's data element size is 64-bits.

FIG. 6B is a diagram illustrating a vector write mask register 640 and the bit locations used as a write mask depending on the vector size and the data element size according to one embodiment of the invention. In FIG. 6B, the vector write mask register is 64-bits wide, although this is not required. Depending upon the combination of the vector size and the data element size, either all 64-bits, or only a subset of the 64-bits, may be used as a write mask. Generally, when a single, per-element masking control bit is used, the number of bits in the vector write mask register used for masking is equal to the vector size in bits divided by the vector's data element size in bits.

Several illustrative examples are shown for vectors of 512 bits. Namely, when the vector size is 512-bits and the vector's data element size is 64-bits, then only the lowest-order 8-bits of the register are used as the write mask. When the vector size is 512-bits and the vector's data element size is 32-bits, then only the lowest-order 16-bits of the register are used as the write mask. When the vector size is 512-bits and the vector's data element size is 16-bits, then only the lowest-order 32-bits of the register are used as the write mask. When the vector size is 512-bits and the vector's data element size is 8-bits, then all 64-bits of the register are used as the write mask. While in the illustrated embodiment the lowest-order subset or portion of the register is used for masking, alternative embodiments may use some other set of bits (e.g., a highest-order subset). Moreover, while FIG. 6B contemplates only a 512-bit vector size, the same principle applies for other vector sizes, such as, for example, 256-bit and 128-bit.

Figure 7A:
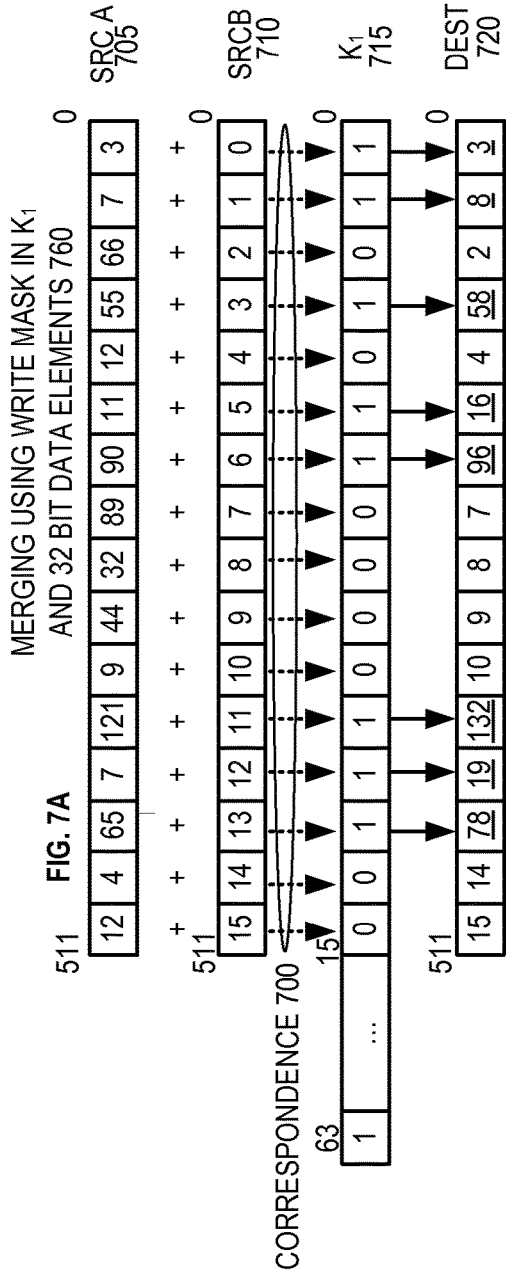
FIG. 7A is a block diagram illustrating an exemplary operation 760 that merges using a write mask from a 64-bit vector write mask register K1 where the vector size is 512 bits and the data element size is 32 bits according to certain embodiments of the invention.

FIG. 7A is a block diagram illustrating an exemplary operation 760 that merges using a write mask from a 64-bit vector write mask register K1 where the vector size is 512 bits and the data element size is 32 bits according to certain embodiments of the invention. FIG. 7A shows a source A operand 705; a source B operand 710; the content of the vector write mask register K1 715 (with the lower 16 bits including a mix of ones and zeros); and the destination operand 720. In addition, an exemplary correspondence 700 is illustrates in FIG. 7A. Specifically, since as described above the bit locations of the multi-bit data elements of the destination vector operands change in embodiments supporting vector operations that operate on different sized data elements (e.g., the bit locations of the multi-bit data elements are different between a vector operation that operates on 32-bit data elements and a vector operation that operates on 64-bit data elements), such embodiments may support different relationships (also referred to as correspondences or mappings) of one bit write mask elements to bit locations within the destination operand; thus, as the bit locations with the destination operand change, the mapping of one bit vector write mask elements change. So, while the correspondence 700 has only the lower 16 bit locations in the vector write mask register K1 (and thus lower 16 vector write mask element positions) corresponding to the data element positions (K1 [0] to data element position 0 occupying bits 31:0, K1 [1] to data element position 1 occupying bits 63:32, and so one), the correspondence changes if size of the data elements is changed (e.g., if the data elements are 16 bit, then K1 [0] to data element position 0 occupying bits 15:0, K1 [1] to data element position 1 occupying bits 32:16, and so one).

For each data element position in the destination vector operand 720, it contains the content of that data element position in the source operand 710 or the result of the operation (illustrated as an add) depending on whether the corresponding bit position in the vector write mask register K1 is a zero or 1, respectively.

Figure 7B:
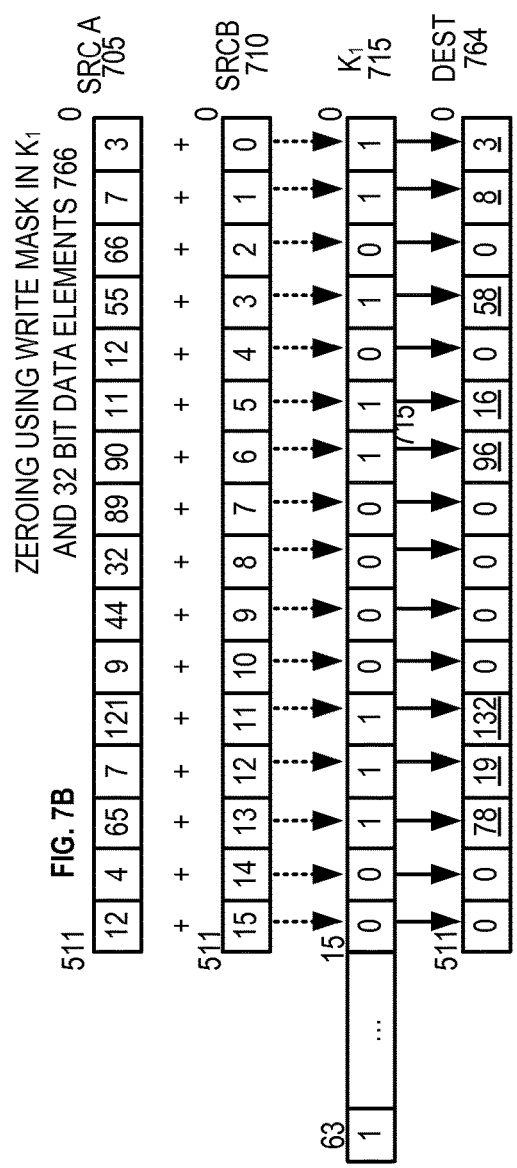
FIG. 7B is a block diagram illustrating an exemplary operation 766 that zeros using the write mask from the 64-bit writemask register K1 where the vector size is 512 bits and the data element size is 32 bits according to certain embodiments of the invention.

FIG. 7B is a block diagram illustrating an exemplary operation 766 that zeros using the write mask from the 64-bit writemask register K1 where the vector size is 512 bits and the data element size is 32 bits according to certain embodiments of the invention. FIG. 7B includes the same items as FIG. 7A, except destination operand 720 is replaced with a destination operand 764. For each data element position in the destination vector operand 764, it contains zero or the result of the operation (illustrated as an add) depending on whether the corresponding bit position in the vector write mask register K1 is a zero or 1, respectively.

Exemplary "Set GPR if Mask is P" Instructions

FIGS. 8A-D and FIG. 9A-D illustrate pseudo code for "set GPR if mask is zero" and "set GPR if mask is not zero" type instructions, respectively, for different source operand 134 sizes according to certain embodiments of the invention. FIG. 8A illustrates pseudo code for a "set GPR if mask is zero" instruction (KSETZB $GPR_Y$, $K_X$) that uses a source operand 134 size of 8 bits according to certain embodiments of the invention. FIG. 8B illustrates pseudo code for a "set GPR if mask is zero" instruction (KSETZW $GPR_Y$, $K_X$) that uses a source operand 134 size of 16 bits according to certain embodiments of the invention. FIG. 8C illustrates pseudo code for a "set GPR if mask is zero" instruction (KSETZD $GPR_Y$, $K_X$) that uses a source operand 134 size of 32 bits according to certain embodiments of the invention. FIG. 8D illustrates pseudo code for a "set GPR if mask is zero" instruction (KSETZQ $GPR_Y$, $K_X$) that uses a source operand 134 size of 64 bits according to certain embodiments of the invention. FIG. 9A illustrates pseudo code for a "set GPR if mask is not zero" instruction (KSETNZB $GPR_Y$, $K_X$) that uses a source operand 134 size of 8 bits according to certain embodiments of the invention. FIG. 9B illustrates pseudo code for a "set GPR if mask is not zero" instruction (KSETNZW $GPR_Y$, $K_X$) that uses a source operand 134 size of 16 bits according to certain embodiments of the invention. FIG. 9C illustrates pseudo code for a "set GPR if mask is not zero" instruction (KSETNZD $GPR_Y$, $K_X$) that uses a source operand 134 size of 32 bits according to certain embodiments of the invention. FIG. 9D illustrates pseudo code for a "set GPR if mask is not zero" instruction (KSETNZQ $GPR_Y$, $K_X$) that uses a source operand 134 size of 64 bits according to certain embodiments of the invention.

Exemplary Code Sequences that Use "Set GPR if Mask is P" Instructions

As previously described, by placing the Boolean value in a GPR as opposed to a control flow register (e.g., a carry flag), decisions based on the Boolean value may be data flow based as opposed to control flow based. Specifically, control flow based decisions rely on instructions that change the flow of execution (jump, branch, etc.), whereas data flow decisions select between data based on the Boolean value. For example, set GPR if mask is P instructions are useful for parameter passing in functions (see FIGS. 10A-B), and for efficient pointer generation and indirect function calls for fast conditional execution of different pieces of code (see FIGS. 11A-B). Specifically, FIGS. 10A and 11A illustrate pseudo-assembly code sequences written in AVX1/AVX2 instructions (see Intel® 64 and IA-32 Architectures Software Developers Manual, October 2011; and see Intel™ Advanced Vector Extensions Programming Reference, June 2011).

FIG. 10A illustrates an exemplary code sequence written in AVX1/AVX2 instructions that passes parameters to a function. The sequence includes two function calls to a function called "foo." The first call to foo passes as parameters A, B, and 1, while the second call passes A, B, and 0. The sequence uses control flow instructions to select between these two function calls. Specifically, the code sequence starts with VMOVAPS, which moves aligned packed single-precision floating-point data elements from A (which may be a ymm register or a 256-bit memory location) to ymm1. Next, VCMPPS compares packed single precision floating-point values in B (which may be a ymm register or a 256-bit memory location) and ymm1 using bits 4:0 of imm8 as a comparison predicate (where bits 4:0 define the type of comparison and bits 5:7 are reserved; and in FIG. 10A indicates less than (LT))). Following this, VPTEST sets the zero flag (ZF) and carry flag (CF) (which are condition code flags in the EFLAGS register) depending on a bitwise logical AND and logical ANDN (ANDNOT) of sources (ZF flag is set if all bits are 0 in the result of the bitwise AND; CF flag is set if all bits are 0 in the result of the bitwise ANDN). Next, JZ jumps to the destination "out" if ZF is equal to 0. This conditional branch (the JZ instruction) can result in a miss-predicted branch, and thus impact performance. If the jump is not taken, then the function call foo (A, B, 1) and jmp end are processed. If the jump is taken, then the function call foo (A, B, 0) and End: are processed.

FIG. 10B illustrates an exemplary code sequence written with a KSETZW instruction that passes parameters to a function according to one embodiment of the invention. The sequence includes only one function call to foo and no JZ instruction, but accomplishes the same result at the sequence in FIG. 10A. Specifically, the code sequence starts with the same VMOVAPS instruction. Next, a new type of VCMPPS instruction is used. This new type of VCMPPS instruction compares packed single precision floating-point data elements in B (which may be a ymm register or a float32 vector memory location) and ymm1 using imm8 as a comparison predicate (which indicates LT as in FIG. 10A) with a vector write mask from vector write mask register K1 and places the result (a quad word write mask of all 1s (comparison true) or all 0s (comparison false) back into K1). Following this, KSETZW sets rax (a GPR) to the scalar constant 1 if the least significant word of K1 is all zero; otherwise it is zeroed. Next, the single function call to foo is performed passing as parameters as A, B, and rax. So setting rax to the scalar constant 1 or scalar constant zero allows rax to be used to pass a 1 or 0 to foo with a single function call. Thus, the sequence in FIG. 10B achieves the same result as in FIG. 10A, but does so with a data flow decision rather than a control flow decision; and thus, FIG. 10B avoids a conditional branch (the JZ instruction) and reduces code size.

FIG. 11A illustrates an exemplary code sequence written in AVX1/AVX2 instructions that uses pointers and an indirect function call. The sequence in FIG. 11A is the same as FIG. 10A, except foo (A, B, 1) is replaced with LEA rbx, foo and (*rbx) (A[ ], B[ ], C[ ]); while foo (A, B, 0) is replaced with LEA rbx, foo+8 and (*rbx) (A[ ], B[ ], C[ ]+size); where a capitol letter in front of "H" (e.g., A[ ]) represents a pointer to an array. The LEA instruction loads an effective address into rbx (a GPR); the first and second occurrences of LEA respectively load the effective address of foo and foo+8 into rbx. This results in the two instructions following the occurrences of the LEA instruction to make an indirect function call to either foo or foo+8 using a pointer (see (*rbx)); and these two function calls differ in passing the parameter C[ ] or C[ ]+size; wherein "size" is a value in memory or a constant (via #define). Again, the conditional branch (the JZ instruction) can result in a miss-predicted branch, and thus impact performance.

FIG. 11B illustrates an exemplary code sequence written with a KSETZW instruction that uses a pointer and an indirect function call according to one embodiment of the invention. Similar to FIG. 10B, the sequence in FIG. 11B includes only one function call and no JZ instruction, but accomplishes the same result at the sequence in FIG. 11A. The sequence in FIG. 11B is the same as in 10B, except foo (A, B, rax) has been replaced with LEA rbx, foo+rax*8; IMUL rax, size; and (*rbx) (A[ ], B[ ], C[ ]+rax). The occurrence of the LEA instructions loads into rbx the effective address of foo+rax*8, where rax is either the scalar constant 0 or 1 depending on the result of the KSETZW instruction; in other words, rbx is loaded with the effective address of foo (calculated foo+0*8) or foo+8 (calculated foo+1*8). The IMUL instruction multiplies two signed integers; the occurrence of the IMUL instruction multiplies the content of rax and size, and stores the result in rax; so rax=rax*size; in other words, rax is made to equal 0*size or 1*size. As a result, (*rbx) (A[ ], B[ ], C[ ]+rax) makes an indirect function call to either foo or foo+8 and respectively passing as a parameter C[ ] or C[ ]+8. So setting rax and rbx to the scalar constant 0 or scalar constant 1 allows rax and rbx to generate different effective addresses and different parameter values with a single function call. Thus, the sequence in FIG. 11B achieves the same result as in FIG. 11A, but does so with a data flow decision rather than a control flow decision; and thus, FIG. 11B avoids a conditional branch (the JZ instruction) and reduces code size.

Exemplary Instruction Encodings

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Encoding

By way of example, the VEX C4 encoding will be described, as well as one example of how a variety of "set GPR if mask is P" instructions may be encoded into it.

FIG. 12A provides a representation of the VEX C4 encoding. The encoding includes the following fields (see Intel® Advanced Vector Extensions Programming Reference, June 2011):

VEX Prefix (Bytes 0-2) 1202—is encoded in a three-byte form.

Format Field 1240 (VEX Byte 0, bits [7:0])—the first byte (VEX Byte 0) is the format field 1240 and it contains an explicit C4 byte value (the unique value used for distinguishing the C4 instruction format).

The second-third bytes (VEX Bytes 1-2) include a number of bit fields providing specific capability. Specifically:

REX field 1205 (VEX Byte 1, bits [7-5])—consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B.

Opcode map field 1215 (VEX byte 1, bits [4:0]-mmmmm)—its content encodes an implied leading opcode byte.

VEX.W (VEX byte 2, bit [7]-W)—is represented by the notation VEX.W, and provides different functions depending on the instruction.

VEX.vvvv 1220 (VEX Byte 2, bits [6:3]-vvvv)—the role of VEX.vvvv may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b.

VEX.L 1268 Size field (VEX byte 2, bit [2]-L)—If VEX.L=0, it indicates 128 bit vector; if VEX.L=1, it indicates 256 bit vector.

Prefix encoding field 1225 (VEX byte 2, bits [1:0]-pp)—provides additional bits for the base operation field.

Real Opcode Field 1230 (Byte 3)

This is also known as the opcode byte. Part of the opcode is specified in this field.

MOD R/M Field 1240 (Byte 4)

Modifier field 1246 (MODR/M.MOD, bits [7-6]-MOD field 1242).

MODR/M.reg field 1244, bits [5-3]—the role of ModR/M.reg field can be summarized to two situations: ModR/M.reg encodes either the destination register operand or a source register operand (the rrr of Rrrr), or ModR/M.reg is treated as an opcode extension and not used to encode any instruction operand.

MODR/M.r/m field 1246, bits [2-0]—The role of ModR/M.r/m field may include the following: ModR/M.r/m encodes the instruction operand that references a memory address, or ModR/M.r/m encodes either the destination register operand or a source register operand.

Scale, Index, Base (SIB) Byte (Byte 5)

Scale field 1260 (SIB.SS, bits [7-6]—The scale field's 1260 content is used for memory address generation.

SIB.xxx 1254 (bits [5-3]) and SIB.bbb 1256 (bits [2-0])—the contents of these fields have been previously referred to with regard to the register indexes Xxxx and Bbbb.

Displacement Byte(s) (Byte 6 or Bytes 6-9)

Immediate 1272 (IMM8) (starting at Byte 7 or 10)

FIG. 12B illustrates which fields from FIG. 12A make up a full opcode field 1274 and a base operation field 1242. FIG. 12C illustrates which fields from FIG. 12A make up a register index field 1244.

Exemplary Encoding

KSETZ{B,W,D,Q} $GPR_Y$, $K_X$ and KSETNZ{B,W,D,Q} $GPR_Y$, $K_X$

Format field 1240=C4

VEX.R and MODR/M.reg field 1244 (Rrrr)—identify $GPR_Y$

VEX.X and VEX.B—ignored

Opcode map field 1215=0F.

VEX.W=x (ignored; or selects the size of the $GPR_Y$–0 for EAX and 1 for RAX).

VEX.vvvv 1220—ignored

VEX.L=0

Prefix encoding field 1225=00

Real Opcode Field 1230—indicates set on zero or set on 1; indicates B,W,D,Q

MODR/M.r/m field 1246—identifies $K_X$. In other words, bits of the instruction historically used for accesses different registers, it is being used herein to access the architectural vector write mask registers.

SIB—ignored (if present)

Displacement field 1262—ignored (if present)

Immediate (IMM8)—ignored (if present)

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
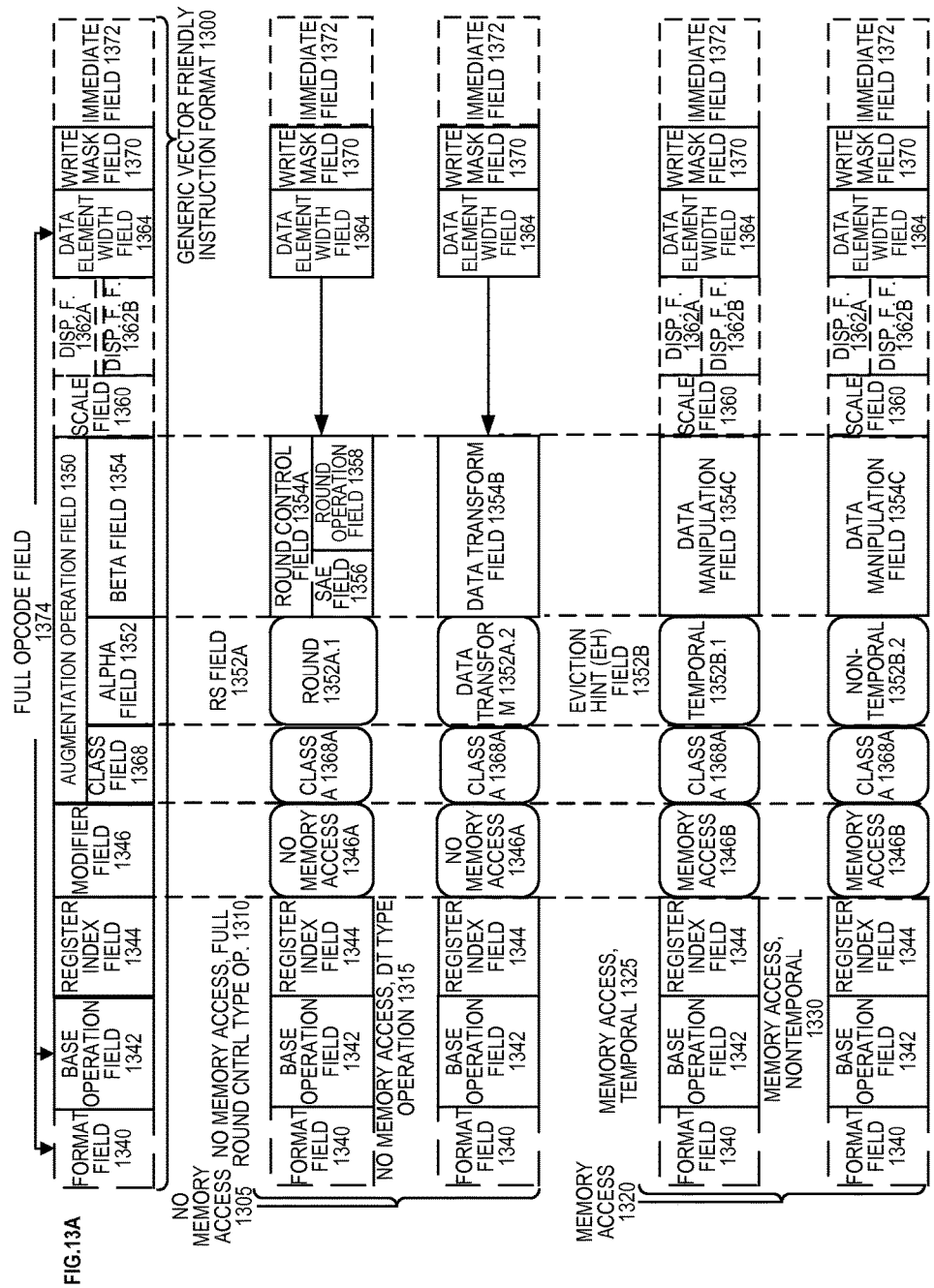
FIG. 13A is a block diagram illustrating a generic vector friendly instruction format and class A instruction templates thereof according to embodiments of the invention.
Figure 13B:
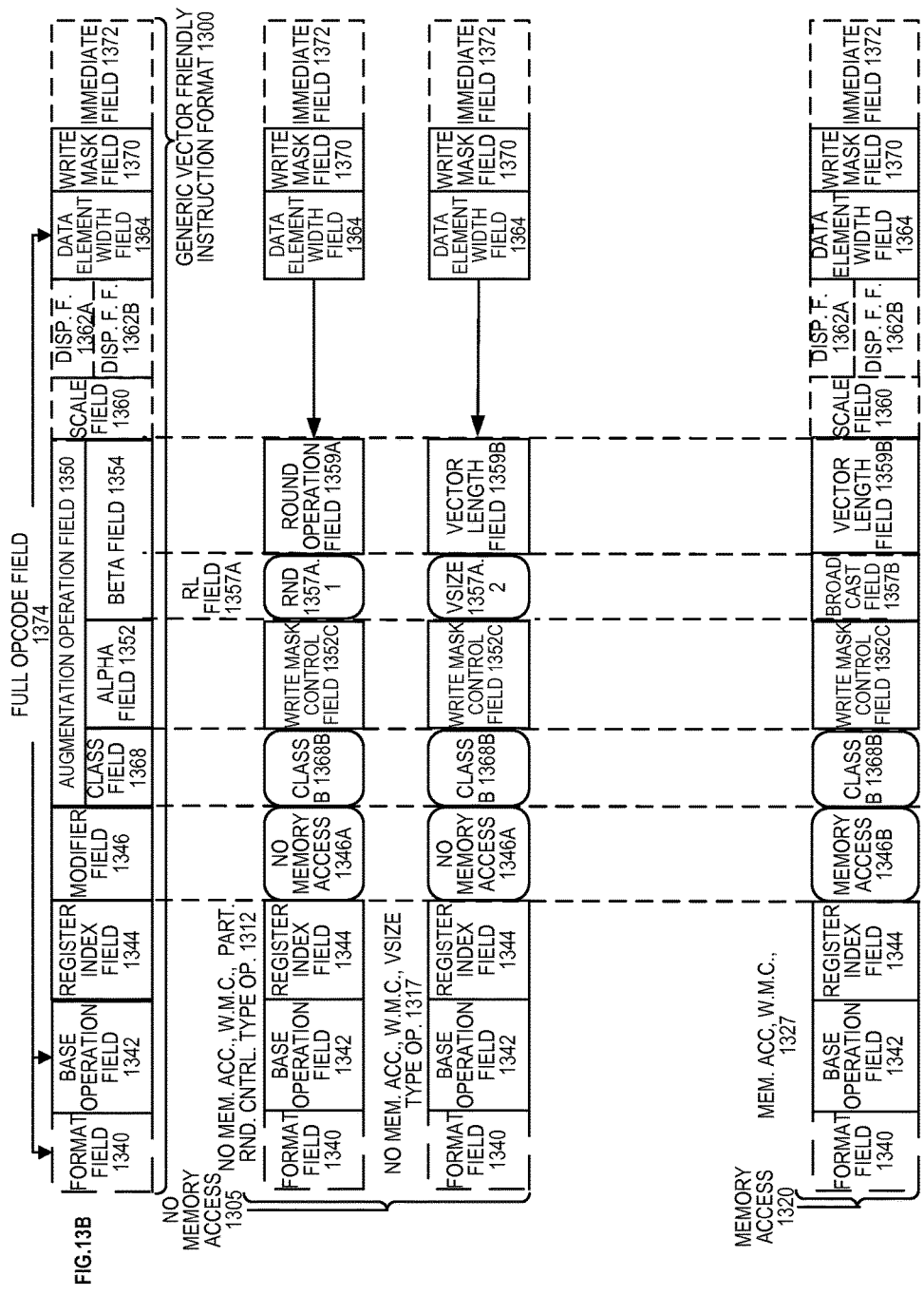
FIG. 13B is a block diagram illustrating the generic vector friendly instruction format and class B instruction templates thereof according to embodiments of the invention.

FIGS. 13A-13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses 2scale*index+base).

Displacement Field 1362A—its content is used as part of memory address generation (e.g., for address generation that uses 2scale*index+base+displacement).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14 is a block diagram illustrating an exemplary specific vector friendly instruction format according to embodiments of the invention. FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7] —R), EVEX.X bit field (EVEX byte 1, bit [6]-X), and 1357BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)—its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.0=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.s2-0, EVEX.r2-0, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-S0) is interpreted as the RL field 1357A; when it contains a 1 (round 1357A.1) the rest of the beta field 1354 (EVEX byte 3, bit [6-5]-S2-1) is interpreted as the round operation field 1359A, while when the RL field 1357A contains a 0 (VSIZE 1357.A2) the rest of the beta field 1354 (EVEX byte 3, bit [6-5]-S2-1) is interpreted as the vector length field 1359B (EVEX byte 3, bit [6-5]-L1-0). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-L1-0) and the broadcast field 1357B (EVEX byte 3, bit [4]-B).

Exemplary Register Architecture

Figure 15:
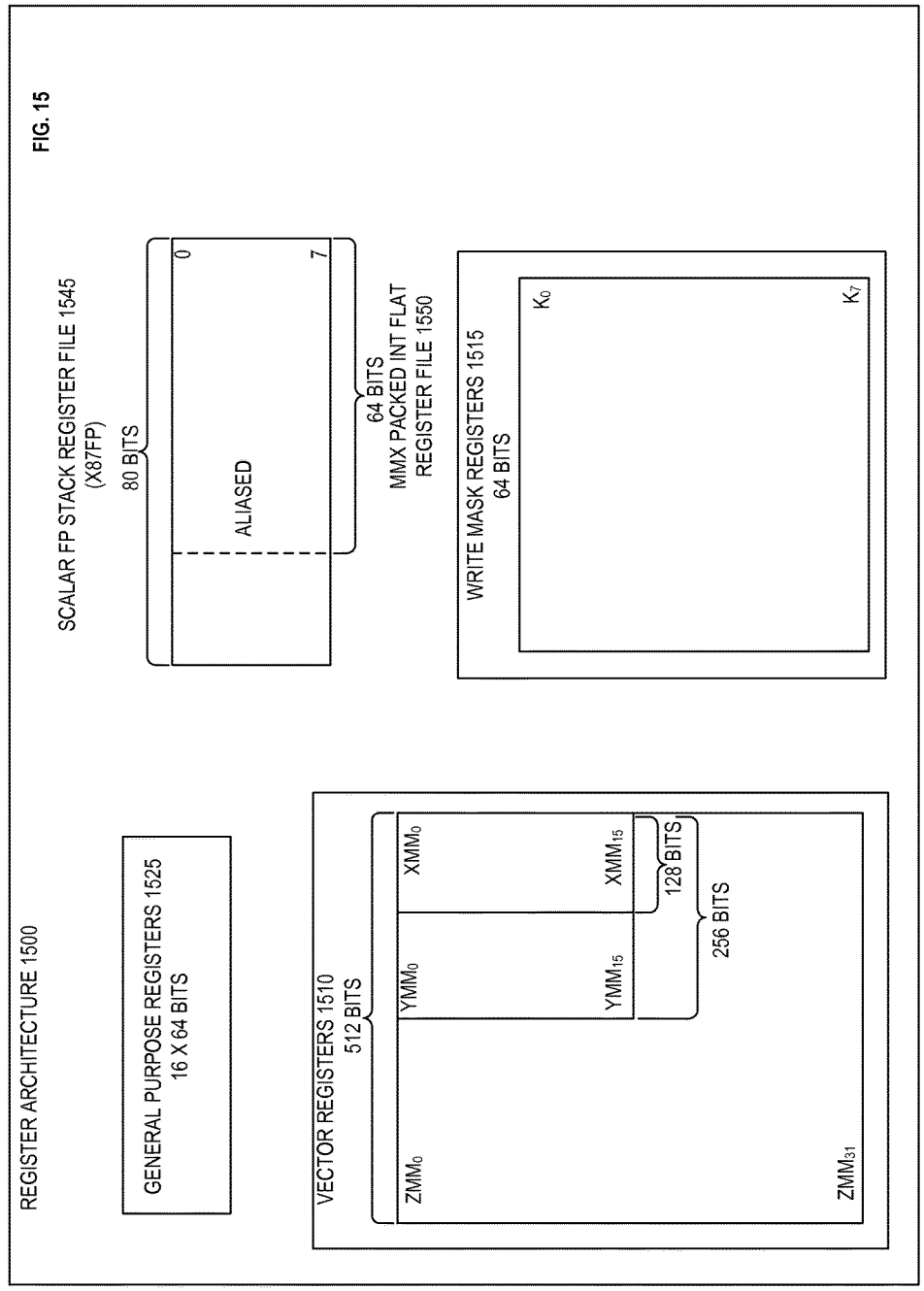
FIG. 15 is a block diagram of a register architecture 1500 according to one embodiment of the invention.

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction Templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB)

1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
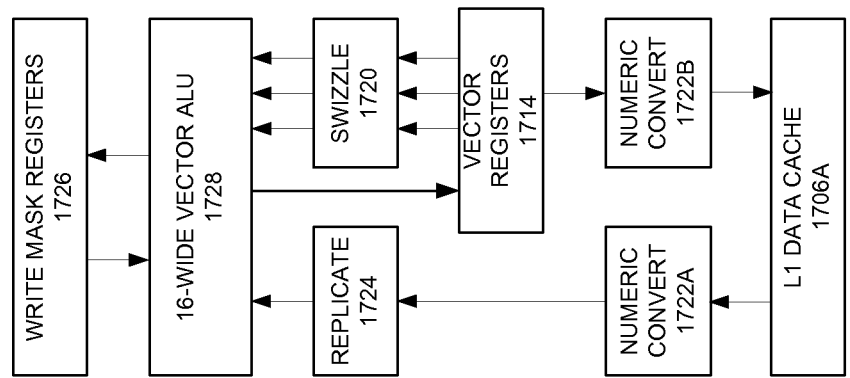
FIG. 17B is an expanded view of part of the processor core in FIG. 17A according to embodiments of the invention.
Figure 17A:
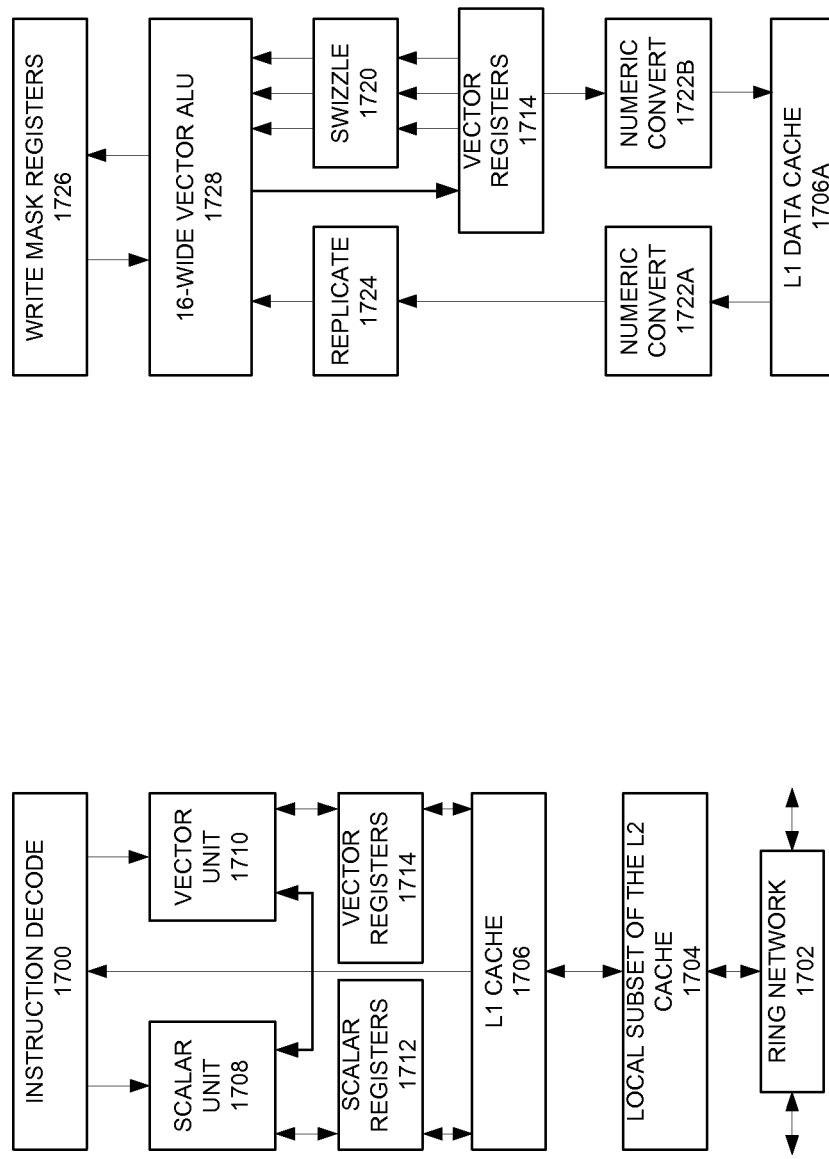
FIG. 17A is a block diagram of a single processor core, along with its connection to the on-die interconnect network 1702 and with its local subset of the Level 2 (L2) cache 1704, according to embodiments of the invention.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
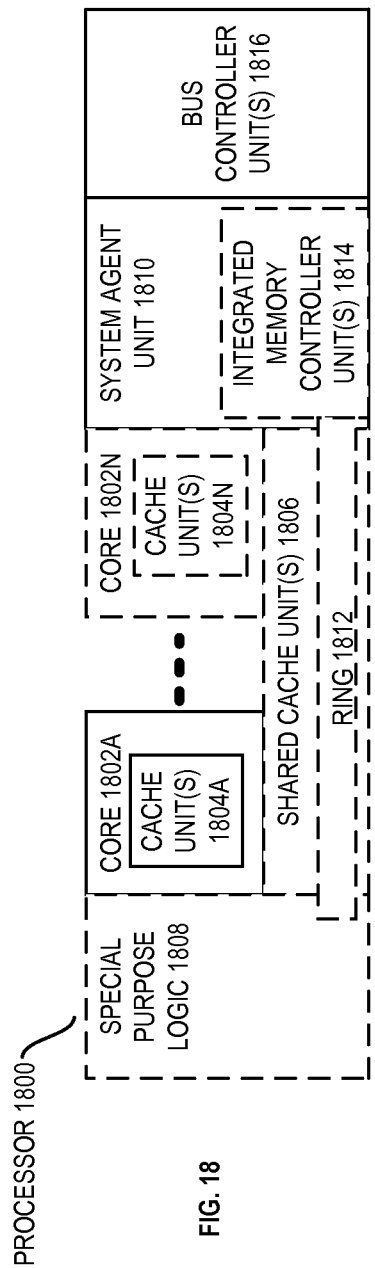
FIG. 18 is a block diagram of a processor 1800 that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
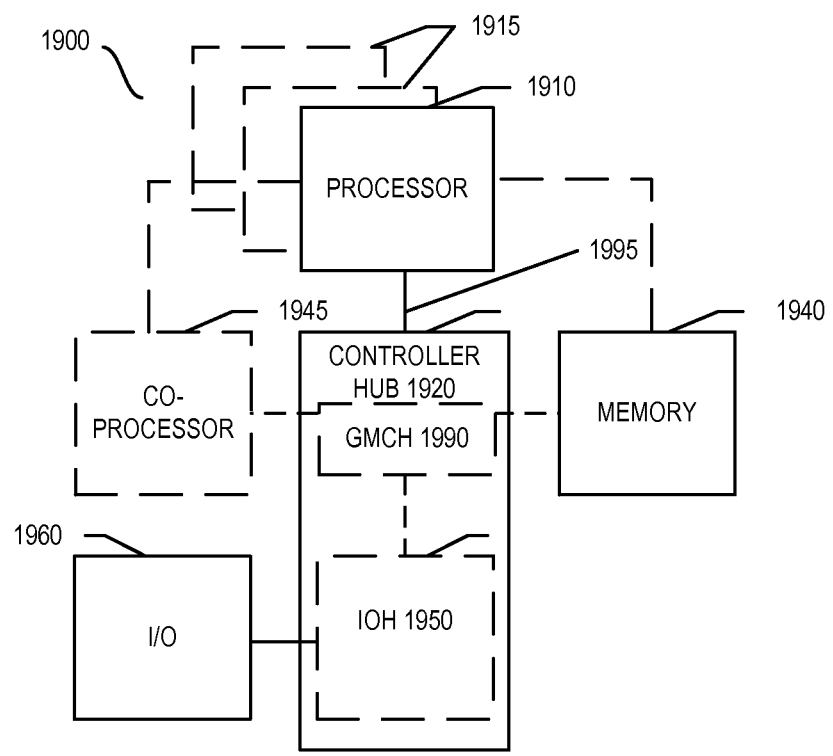
FIG. 19 is a block diagram of a system 1900 in accordance with one embodiment of the present invention.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
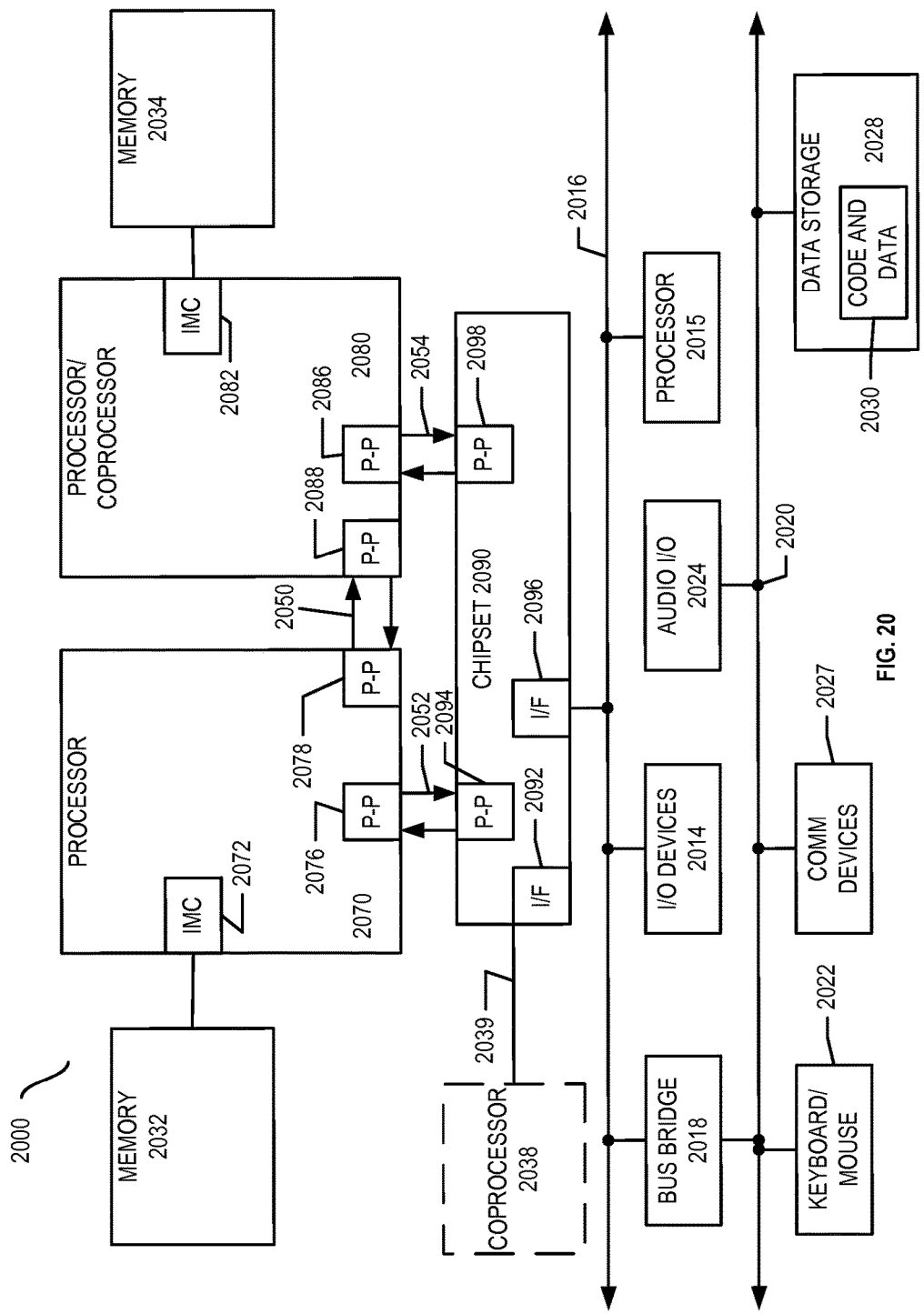
FIG. 20 is a block diagram of a first more specific exemplary system 2000 in accordance with an embodiment of the present invention.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
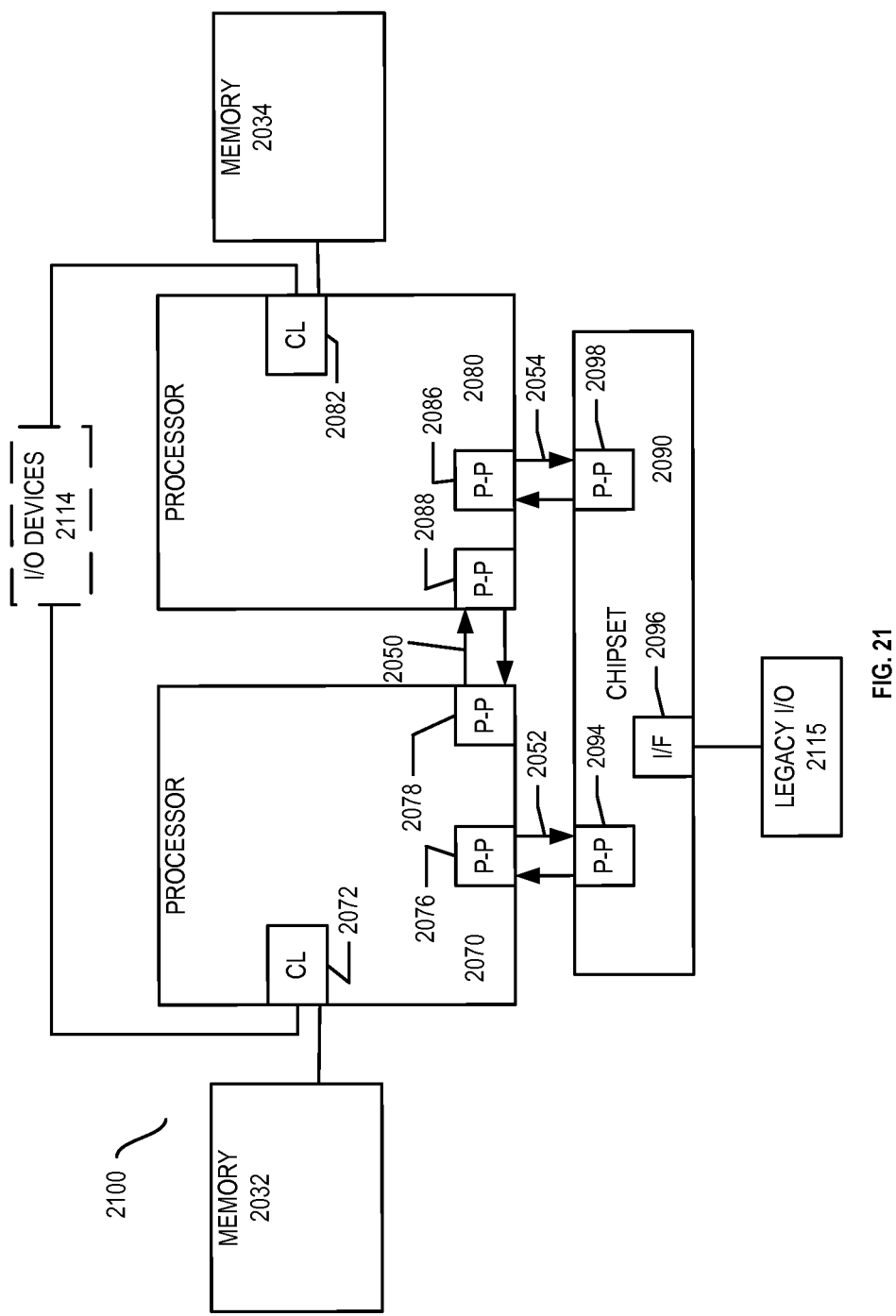
FIG. 21 is a block diagram of a second more specific exemplary system 2100 in accordance with an embodiment of the present invention.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
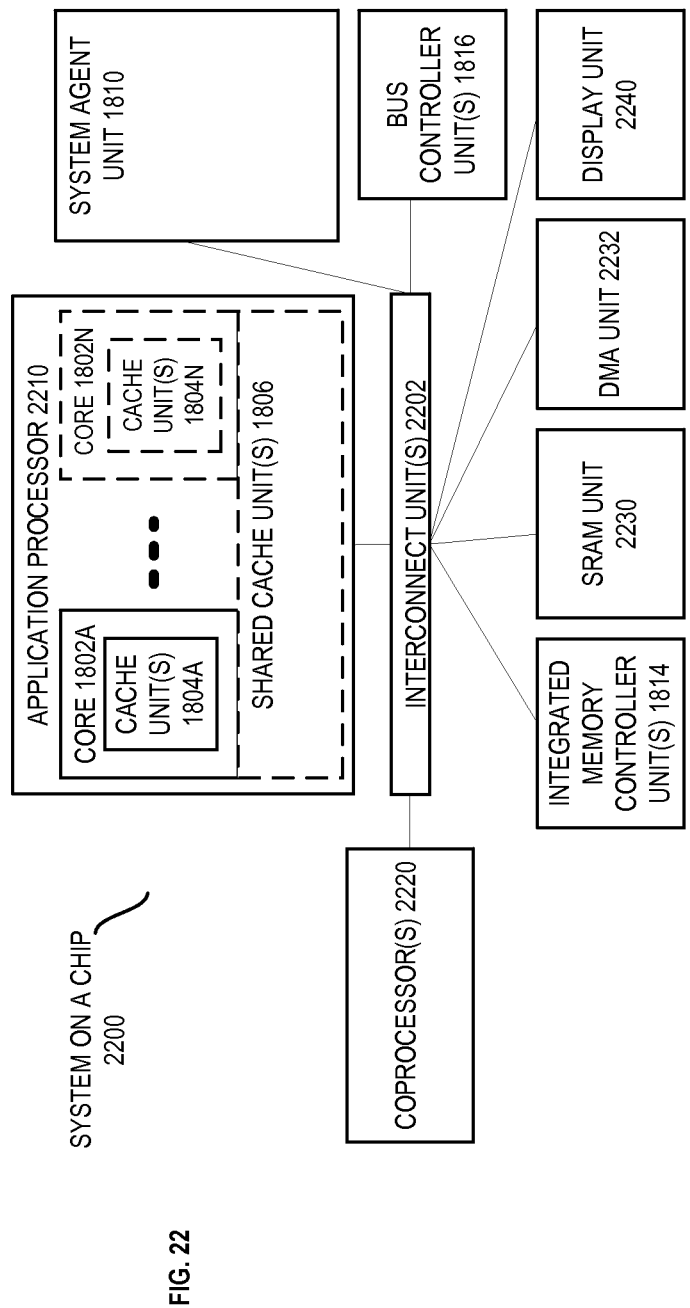
FIG. 22 is a block diagram of a SoC 2200 in accordance with an embodiment of the present invention.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Alternative Embodiments

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting. For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

What is claimed is:

1. A computer-implemented method comprising:
fetching an instruction specifying a general purpose register (GPR) and a writemask register;
decoding the fetched instruction;
executing the decoded instruction to store either a first or a second scalar constant in the specified GPR based on whether a plurality of one bit vector write mask elements in the specified writemask register are all zero or not; and
using a value of the specified GPR to apply a data flow decision rather than a control flow decision while executing one or more subsequent instructions by:
selecting, without accessing a condition code in an EFLAGS register, between first and second parameters to pass to a function in response to the value being the first and second scalar constant, respectively; and
selecting, without applying a JUMP instruction, between first and second effective addresses for a function call in.

2. The method of claim 1, wherein the first and second scalar constants are respectively one and zero.

3. The method of claim 2, wherein the storing includes storing data in a full width of the GPR such that its contents represent one when the plurality of one bit vector write mask elements are all zero.

4. The method of claim 2, wherein the storing includes storing data in a full width of the GPR such that its contents represent zero when the plurality of one bit vector write mask elements are all zero.

5. The method of claim 1, wherein an opcode of the instruction specifies a size of a number of write mask elements in the specified writemask register.

6. The method of claim 5, wherein a size of a multi-bit data element of the specified writemask register is less than a size of the specified write mask register.

7. The method of claim 6, wherein a plurality of one bit vector write mask elements are to occupy contiguous bits within the specified write mask register starting from a least significant bit.

8. The method of claim 1, wherein the instruction is part of an instruction set architecture (ISA) and the specified writemask register is one of a plurality of architectural vector write mask registers, wherein other instructions from said ISA specify vector operations, select destinations, and select from the write masks in the plurality of architectural vector write mask registers, wherein for each of the other instructions the plurality of one bit vector write mask elements of the selected write mask control which of the data element positions in the selected destination reflect the result of the instruction's vector operation.

9. The method of claim 1, wherein the specified GPR is to store the scalar constant in its full width, the specified GPR subsequently to be used as an operand for logical operations, arithmetic operations, address calculations, and memory pointers.

10. The method of claim 1, wherein there are at least 16 architectural general purpose registers that are at least 64 bits in size, wherein there are at least 8 architectural vector write mask registers that are at least 32 bits in size to store write masks, and wherein there are at least 16 architectural vector registers that are at least 256 bits in size to store vectors.

11. The method of claim 1, wherein there are at least 16 architectural general purpose registers that are at least 64 bits in size, wherein there are at least 8 architectural vector write mask registers that are at least 64 bits in size to store write masks, and wherein there are at least 32 architectural vector registers that are at least 512 bits in size to store vectors.

12. The method of claim 1, wherein the executing includes:
performing a logical OR operation on the plurality of one bit vector write mask elements; and
generating the first or second scalar constant based on the result of the logical OR operation.

13. The method of claim 12, wherein the generating includes:
negating the result of the logical OR operation;
converting the negated value to a 64 bit unsigned integer value to form said first or second scalar constant.

14. The method of claim 12, wherein the generating includes:
multiplexing either the first or second scalar constant based on a control signal formed from the result of the logical OR operation.

15. A processor core comprising;
fetch circuitry to fetch an instruction specifying a general purpose register (GPR) and a writemask register;
decode circuitry to decode the fetched instruction; and
execution circuitry, responsive to the decoded instruction, to store either a first or a second scalar constant in the specified GPR when a plurality of one bit vector write mask elements in the specified writemask register are all zero or not, respectively, the execution circuitry further to apply a data flow decision rather than a control flow decision while executing one or more subsequent instructions by using the specified GPR to:
select, without accessing a condition code in an EFLAGS register, between first and seconds parameters to pass to a function; and
select, without applying a JUMP instruction, between first and second effective addresses for a function call.

16. An article of manufacture comprising a tangible non-transitory machine-readable storage medium having stored thereon instructions that, when executed by a processor, cause the processor to:
fetch, using fetch circuitry, an instruction specifying a general purpose register (GPR) and a writemask register;
decode, using decode circuitry, the fetched instruction; and
execute the decoded instruction, using execution circuitry, to store either a first or a second scalar constant in the specified GPR when a plurality of one bit vector write mask elements in the specified writemask register are all zero or not, respectively, the execution circuitry further to apply a data flow decision rather than a control flow decision while executing one or more subsequent instructions by using the specified GPR to:

select, without accessing a condition code in an EFLAGS register, between first and seconds parameters to pass to a function; and select, without applying a JUMP instruction, between first and second effective addresses for a function call.

17. The article of manufacture of claim 16, wherein the instruction is further to specify an opcode, wherein the opcode indicates that the contents of the specified GPR represent one when the plurality of one bit vector write mask elements are all zero, and represent zero otherwise.

18. The article of manufacture of claim 16, wherein the instruction is further to specify an opcode, wherein the opcode indicates that the contents of the specified GPR represent zero when the plurality of one bit vector write mask elements are all zero, and represent one otherwise.

* * * * *